United States Patent
Iguchi et al.

(10) Patent No.: US 8,091,387 B2
(45) Date of Patent: Jan. 10, 2012

(54) METHOD OF MANUFACTURING GLASS ARTICLES, METHOD OF MANUFACTURING GLASS GOBS, AND METHOD OF MANUFACTURING OPTICAL ELEMENTS

(75) Inventors: Yoshinori Iguchi, Fussa (JP); Katsumi Utsugi, Tachikawa (JP); Atsushi Uezaki, Oume (JP); Junichi Watanabe, Hachioji (JP); Tetsuya Saito, Hamura (JP); Akira Murakami, Akiruno (JP)

(73) Assignee: Hoya Corporation, Tokyo (JP)

( * ) Notice: Subject to any disclaimer, the term of this patent is extended or adjusted under 35 U.S.C. 154(b) by 2069 days.

(21) Appl. No.: 10/802,837

(22) Filed: Mar. 18, 2004

(65) Prior Publication Data
US 2004/0237592 A1 Dec. 2, 2004

(30) Foreign Application Priority Data

Mar. 19, 2003 (JP) ................................ 2003-074893
Mar. 20, 2003 (JP) ................................ 2003-076968

(51) Int. Cl.
*C03B 7/10* (2006.01)
*C03B 7/12* (2006.01)
*C03B 7/14* (2006.01)

(52) U.S. Cl. ................ 65/133; 65/126; 65/127; 65/303; 65/304; 65/207; 65/225; 65/334; 65/325

(58) Field of Classification Search ............... 65/66, 133, 65/125, 324, 328, 330, 331
See application file for complete search history.

(56) References Cited

U.S. PATENT DOCUMENTS

| | | | | |
|---|---|---|---|---|
| 1,788,037 A * | 1/1931 | Swain | | 65/123 |
| 1,853,002 A * | 4/1932 | Howard | | 65/122 |
| 4,249,927 A * | 2/1981 | Fukuzaki et al. | | 65/75 |
| 5,738,701 A * | 4/1998 | Ikeuchi et al. | | 65/29.12 |
| 6,854,289 B2 * | 2/2005 | Yoshikuni et al. | | 65/64 |
| 2003/0000252 A1 * | 1/2003 | Yoshikuni et al. | | 65/61 |
| 2003/0131628 A1 * | 7/2003 | Murakami et al. | | 65/21.2 |

FOREIGN PATENT DOCUMENTS

| | | |
|---|---|---|
| JP | 02-034525 A | 2/1990 |
| JP | 05-147949 A | 6/1993 |
| JP | 07-300319 A | 11/1995 |
| JP | 11-035333 A | 2/1999 |
| JP | 2000-007360 A | 1/2000 |
| JP | 2000-119026 A | 4/2000 |

* cited by examiner

*Primary Examiner* — Jason L. Lazorcik
(74) *Attorney, Agent, or Firm* — Sughrue Mion, PLLC

(57) ABSTRACT

A method of manufacturing high-quality preforms from glass melt, manufacturing glass elements, such as lenses, by press molding these preforms and, manufacturing optical elements by reheating and press molding these glass gobs. In the method glass gobs are continuously separated from a glass melt flow continuously flowing out of a nozzle and the separated glass gobs are formed with glass forming members that are intermittently or continuously moving. A support member is made to approach the front end of the nozzle, the front end of the glass melt flow is received by the support member, and the support member is dropped more rapidly than the rate of flow of the glass melt flow to separate a glass gob from the glass melt flow. The separated glass gob is transferred from the support member to a stopped or moving glass forming member to mold a glass article.

25 Claims, 6 Drawing Sheets

METHOD OF MANUFACTURING GLASS ARTICLES, METHOD OF MANUFACTURING GLASS GOBS, AND METHOD OF MANUFACTURING OPTICAL ELEMENTS

TECHNICAL FIELD

The present invention relates to a method of manufacturing with high production efficiency glass articles, such as high-quality preforms for press molding (press-molding preforms) from glass melt, and to a method of manufacturing glass elements, such as lenses, by press molding these preforms. Further, the present invention relates to a method of molding glass gobs suited to the press molding of preforms of high quality and high weight precision from a glass melt, and to a method of manufacturing optical elements by reheating and press molding these glass gobs.

BACKGROUND ART

The method of heat softening a glass article of prescribed weight, known as a preform, and press molding it in a pressing mold is widely employed to efficiently manufacture optical glass elements such as aspherical lenses. In this method, an optically functional surface such as a lens surface is precisely molded by press molding, obviating the need for mechanical processing such as grinding or polishing of the optically functional surface. Normally, the above method is called precision press molding or mold optics molding.

In precision press molding, high internal quality and surface quality are required of the preform. When the internal quality is low, only optical elements of low internal quality can be obtained. Further, the surface quality of molded products obtained using preforms of low surface quality is also poor. Since the optically functional surface of an optical element manufactured by precision press molding is not subjected to mechanical processing, only optical elements with low quality optically functional surfaces can be obtained.

There are also methods of manufacturing the above preforms in which a preform of prescribed weight is obtained by mechanically processing a glass material and in which a prescribed weight of glass melt is molded to obtain a preform. The latter method is referred to as hot preform forming; this is a good method for mass-producing high-quality preforms. An example of such a hot preform forming method is disclosed in Unexamined Japanese Patent Publication (KOKAI) Heisei No. 8-81228 (Reference 1).

In the method described in Reference 1, multiple dies positioned on an index table are rotated and a single die is displaced vertically at a casting position to receive a prescribed weight of glass melt on the die. When being displaced, the single die moves directly beneath a nozzle, and when the die is raised and stopped, glass melt is loaded from the nozzle onto the forming surface. When the die is lowered at a timing yielding the required weight, the glass melt is pulled away from the nozzle. A prescribed weight of glass is then present on the die. The particular die is then moved out from under the nozzle and the next die moves beneath the nozzle. This is continuously repeated to cut the glass and manufacture glass gobs.

Since cutting is not conducted based on shear, this method is well suited to manufacturing high-quality glass elements without defects knows as shear marks.

However, since the cutting operation and the die rotating operation are conducted by a single mechanism, increasing the number of preforms produced requires shortening the time during which the next die moves under the nozzle after cutting the glass. It becomes necessary to increase the rate of movement of the table, increasing the acceleration in a horizontal direction (horizontal acceleration) that is exerted on the glass melt during movement. Since the glass supplied to the die remains briefly in a state of elevated temperature after being fed to the die, the exertion of a large horizontal acceleration causes defects such as deformation. Further, a high horizontal acceleration may also cause problems such as the generation of gaps in the surface of the preform. That is, so long as the cutting operation and the die rotating operation are conducted by a single mechanism, the increase in the number of units produced without the above-stated problems occurring is spontaneously limited.

Further, since the height of the die during cutting affects the weight precision of the preform, manufacturing preforms with precise weight precision requires microadjustment of the height of multiple dies. However, microadjustment of the height of multiple dies constitutes a substantial burden.

The first object of the present invention is to provide a more rapid method of manufacturing higher quality glass articles which overcomes the drawbacks of conventional glass article manufacturing methods, and a method of manufacturing optical elements employing the preforms manufactured by this method.

Methods of manufacturing preforms for press molding (press-molding preforms), in which the glass melt flows out of a nozzle, is received by a die, and is formed, are known. An example of such methods is disclosed in Unexamined Japanese Patent Publication (KOKAI) Heisei No. 8-81228 (Reference 1). In this method, the front portion of the glass melt that is about to drip from a nozzle is supported, and at a timing designed to separate a prescribed weight of glass, the receiving die is dropped more rapidly than the flow rate of the glass melt. The front end portion of the glass melt, still supported by the receiving die, separates from the nozzle, yielding glass melt of prescribed weight on the receiving die. Subsequently, the glass melt is simultaneously cooled and formed into a preform. In this method, it is possible to adjust the distance between the receiving mold and the front end of the nozzle to vary the weight of the preform.

In addition to the method disclosed in Reference 1, there is a forming method in which a glass droplet naturally dripping from a nozzle is received and formed by a receiving die.

In the method described in Reference 1, since flowing glass is successively received by multiple receiving dies, precisely regulating the weight of the preforms to a prescribed weight requires precise adjustment of the height of each receiving die as it receives the glass. Further, the glass on the receiving die loses heat from the surface of the glass to a die with which it comes into contact, while the upper portion consists of hot glass that has been newly fed by the nozzle. Thus, the viscosity within a single glass gob is rendered nonuniform. For this reason, there is a problem in that well-shaped preforms cannot be obtained from glass undergoing considerable change in viscosity with change in temperature (known as "short" glass). There is also a problem in that striae tend to form due to convection within the glass.

In the method of forming glass droplets of naturally dripping glass, it is possible to control the weight of the glass droplets more precisely than in the method described in Reference 1 by keeping the glass flow conditions constant. However, the timing at which the glass drips down is determined by a balance between surface tension and the gravitational force exerted on the glass at the front end of the nozzle. Specifically, denoting the diameter of the glass melt in droplet form at the front end of the nozzle as "D", a parameter representing the magnitude of the surface tension as "$\gamma$", gravitational acceleration as "g", and the mass of the glass when dripping as "M", this timing is approximately determined by $Mg=\gamma\pi D$. Accordingly, it is difficult to manufacture a preform of a weight where the surface tension is less than the above gravitational force. There is thus a drawback in the form of a low degree of freedom in setting the weight.

Based on these problems, there is the need for a technique of forming glass preforms of good shape and high quality that both affords a high degree of freedom in setting the weight of the preform and achieves molding of high precision with respect to the weight that is set.

The second object of the present invention is to provide a method of manufacturing glass gobs affording good shape, high quality, free choice of weight, and high weight precision in response to the above-stated need, as well as a method of manufacturing optical elements by press molding the glass gobs produced by the latter method.

DISCLOSURE OF THE INVENTION

The present inventors conducted extensive research into solving the above-stated problems. As a result, they discovered that the above first object could be achieved by separating the front end portion of a glass melt flow flowing from a nozzle with a different member from the glass forming member used to form the glass, transferring this portion to a glass forming member, and forming the glass on the glass forming member into a glass article while moving it; the present invention was devised on this basis.

Modes 1 and 2 of the present invention, which achieve the above first object, are as follows.

(1) A method of manufacturing glass articles (referred to below as Manufacturing Method 1-1) by continuously separating glass gobs from a glass melt flow continuously flowing out of a nozzle and forming the separated glass gobs with glass forming members that are intermittently or continuously moving, characterized in that:

a support member is made to approach the front end of the nozzle, the front end of the glass melt flow is received by the support member, and the support member is dropped more rapidly than the rate of flow of the glass melt flow to separate a glass gob from the glass melt flow;

the separated glass gob is transferred from the support member to a stopped or moving glass forming member to form a glass article; and in the case where the glass gob is moved to a stopped glass forming member, the period during which the glass forming member is stopped for transfer of the glass gob from the support member to the glass forming member is made shorter than the period required for one cycle of preparing one glass glob from the glass melt flow using the support member and moving the glass gob to the glass forming member.

(2) A method of manufacturing glass articles (referred to below as Manufacturing Method 1-2) by continuously separating glass gobs from a glass melt flow continuously flowing out of a nozzle and forming the separated glass gobs with glass forming members that are intermittently or continuously moving, characterized in that:

a support member is made to approach the front end of the nozzle, the front end of the glass melt flow is received by the support member, this front end is supported to form a constriction between the nozzle side and the support side of the glass melt flow, and the support member is dropped to separate the glass gob from the glass melt flow at the constriction;

the separated glass gob is transferred from the support member to a stopped or moving glass forming member to form a glass article; and in the case where the glass gob is moved to a stopped glass forming member, the period during which the glass forming member is stopped for transfer of the glass gob from the support member to the glass forming member is made shorter than the period required for one cycle of preparing one glass glob from the glass melt flow using the support member and moving the glass gob to the glass forming member.

(3) A method of manufacturing glass articles (referred to below as Manufacturing Method 1-3) by continuously separating glass gobs from a glass melt flow continuously flowing out of a nozzle and forming the separated glass gobs with glass forming members that are intermittently or continuously moving, characterized in that:

a support member is made to approach the front end of the nozzle, the front end of the glass melt flow is received by the support member, this front end is supported to form a constriction between the nozzle side and the support side of the glass melt flow, and support of the support member is removed to separate the glass gob from the glass melt flow at the constriction;

the separated glass gob is transferred from the support member to a stopped or moving glass forming member to form a glass article; and in the case where the glass gob is moved to a stopped glass forming member, the period during which the glass forming member is stopped for transfer of the glass gob from the support member to the glass forming member is made shorter than the period required for one cycle of preparing one glass glob from the glass melt flow using the support member and moving the glass gob to the glass forming member.

(4) The manufacturing method according to any of (1) to (3), wherein the period during which the glass forming member is stopped for transfer of the glass gob from the support member to the glass forming member, or the time for transferring the glass gob from the support member to a moving glass forming member, is made shorter than the period from when the support member begins to approach the nozzle to when the glass gob has been completely separated.

(5) A method of manufacturing glass articles (referred to below as Manufacturing Method 2-1) by continuously separating glass gobs from a glass melt flow continuously flowing out of a nozzle and forming the separated glass gobs with glass forming members that are intermittently or continuously moving, characterized in that:

the step of receiving the front end of the glass melt flow by a support member and dropping the support member more rapidly than the flow rate of the glass melt flow to separate the glass gob is repeated once in a fixed cycle period, the separated glass gob is transferred from the support member to a stopped or moving glass forming member to form a glass article; and in the case where the glass gob is moved to a stopped glass forming member, the period during which the glass forming member is stopped for transfer of the glass gob from the support member to the glass forming member is made less than or equal to 70 percent of the above cycle period.

(6) A method of manufacturing glass articles (referred to below as Manufacturing Method 2-2) by continuously separating glass gobs from a glass melt flow continuously flowing out of a nozzle and forming the separated glass gobs with glass forming members that are intermittently or continuously moving, characterized in that:

the step of receiving the front end of the glass melt flow by a support member, supporting this front end to form a constriction between the nozzle side and the support side of the glass melt flow, and dropping the support member to separate the glass gob from the glass melt flow at the constriction is repeated once in a fixed cycle period, the separated glass gob is transferred from the support member to a stopped or moving glass forming member to form a glass article; and in the case where the glass gob is moved to a stopped glass forming member, the period during which the glass forming member is stopped for transfer of the glass gob from the support member to the glass forming member is made less than or equal to 70 percent of the above cycle period.

(7) A method of manufacturing glass articles (referred to below as Manufacturing Method 2-3) by continuously separating glass gobs from a glass melt flow continuously flowing out of a nozzle and molding the separated glass gobs with glass forming members that are intermittently or continuously moving, characterized in that:

the step of receiving the front end of the glass melt flow by a support member, supporting this front end to form a constriction between the nozzle side and the support side of the glass melt flow, and removing support from the support member to separate the glass gob from the glass melt flow at the constriction is repeated once in a fixed cycle period, the separated glass gob is transferred from the support member to a stopped or moving glass forming member to form a glass article; and in the case where the glass gob is moved to a stopped glass forming member, the period during which the glass forming member is stopped for transfer of the glass gob from the support member to the glass forming member is made less than or equal to 70 percent of the above cycle period.

(8) The manufacturing method according to any of (1) to (7), wherein the surface receiving the glass gob of the support member is a flat surface and this flat surface is rotated 360° to transfer the glass gob to the glass forming member.

(9) The manufacturing method according to any of (1) to (8), wherein the surface of the support member receiving the glass gob is tilted to cause the glass gob to fall off, thereby transferring the glass gob to the glass forming member, and the direction of the fall of the glass gob is consistent with the direction of movement of the glass forming member.

(10) The manufacturing method according to any of (1) to (9), wherein two consecutively produced glass gobs are separated by receiving the glass melt flow on two different surfaces of the support member.

(11) The manufacturing method according to any of (1) to (10), wherein, in the course of transferring the glass gob from the support member to the glass forming member, the glass gob is turned upside down.

(12) The manufacturing method according to any of (1) to (11), wherein gas is blown from the surface of the support member receiving the front end of the glass melt flow when receiving this front end.

(13) The manufacturing method according to any of (1) to (12), wherein the glass article is a preform for press molding comprised of optical glass.

(14) A method of manufacturing optical elements, characterized in that a glass article obtained by the manufacturing method according to (13) is heat softened and then press molded.

Mode 3 of the present invention, achieving the above-stated second object, is as follows.

(15) A method of manufacturing glass gobs in which glass gobs are formed from a glass melt flowing out of a nozzle, characterized in that:

prior to dripping from the nozzle, the glass melt flowing out is brought into contact with a support member beneath the lower end of the glass melt flowing out of the nozzle, the support member is then moved downward from beneath the lower end of the glass melt at a speed greater than the flow speed of the glass melt, causing a glass gob of prescribed weight to drip onto the support member from the nozzle.

(16) The method of manufacturing glass gobs according to (15), further characterized in that the support member is moved downward in such a manner that contact is temporarily broken between the support member and the lower end of the glass melt.

(17) The manufacturing method according to (15) or (16), further characterized in that the glass glob that has dripped is rendered spherical on the support member or after being moved to the glass forming member from the support member.

(18) The manufacturing method according to any of (15) to (17), further characterized in that the difference between the softening point and the glass transition temperature of the glass is less than or equal to 100° C.

(19) The method of manufacturing glass gobs according to any of (15) to (18), further characterized in that the glass gob is a preform for press molding.

(20) A method of manufacturing optical elements, characterized in that a preform for press molding manufactured by the manufacturing method according to (19) is heat softened and press molded.

Figure 1:
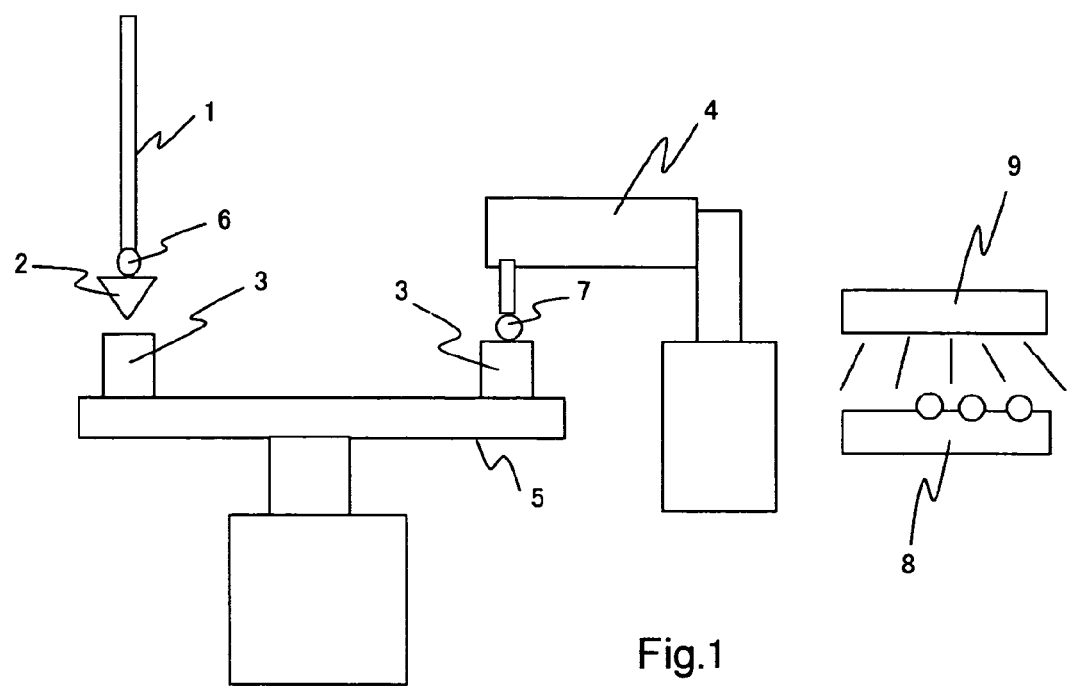
FIG. 1 is a schematic lateral view of an example of a glass article forming device employed in the manufacturing method of the present invention.

Based on the method of manufacturing glass articles (modes 1 and 2) of the present invention, separation of the glass melt and movement of the glass forming member are independently conducted, reducing the force (acceleration) exerted on the glass during forming and permitting the highly efficient manufacturing of high-quality glass articles. In particular, movement of the glass forming member can be conducted with time to spare, even when the flow rate of the glass melt is increased. Further, it is possible to greatly shorten the tact time (the time required to prepare one molded glass article) relative to prior art methods.

Further, based on the method of manufacturing glass articles (modes 1 and 2) of the present invention, since the height of multiple glass gob forming dies does not have to be precisely adjusted to maintain uniform weight of the glass gobs, the adjustment load is reduced. Thus, it is possible to reduce the range of fluctuation in the weight of glass articles by simpler adjustment than in prior art.

Still further, based on the method of manufacturing glass articles ((modes 1 and 2) the modes where the glass gobs are turned upside down in the process) of the present invention, cooling efficiency is enhanced, the forming tact can be shortened, and glass articles with little distortion can be obtained.

Still further, based on the method of manufacturing glass articles (modes 1 and 2) of the present invention, it is possible to manufacture high-quality preforms for press molding.

Based on the method of manufacturing optical elements (modes 1 and 2) of the present invention, since a high-quality preform for press molding is fed with high production efficiency, good optical elements can be provided with high production efficiency and the yield in the pressing step can be improved.

The method of manufacturing glass gobs (mode 3) of the present invention, provides a method of manufacturing well-shaped, high-quality glass gobs of precise weight, particularly glass gobs suitable for use as preforms in press molding. Further, the degree of freedom in setting the weight of the glass gobs is increased. Still further, it is possible to form even glasses undergoing large changes in viscosity with temperature change into good shapes.

Based on the method of manufacturing optical elements (mode 3) of the present invention, well-shaped, high-quality preforms of precise weight are fed with high production efficiency, permitting the manufacturing of optical elements with high production efficiency.

BEST MODE OF IMPLEMENTING THE INVENTION

Mode 1 of the method of manufacturing glass articles of the present invention is a method of manufacturing glass articles in which glass gobs are continuously separated from a glass melt flow continuously flowing out of a nozzle and the separated glass gobs are formed by intermittently or continuously moving glass forming members.

Manufacturing Method 1-1 is characterized in that a support member approaches the front end of the nozzle, the front end of the glass melt flow is received by the support member, the support member is dropped faster than the flow rate of the glass melt flow to separate a glass gob from the glass melt flow, the separated glass gob is then transferred to a glass forming member that is either stopped or moving, and, in the case where the glass gob is transferred to a stopped glass forming member, the time during which the glass forming member is stopped for transfer of the glass gob from the support member to the glass forming member is made shorter than the time required for one cycle of preparing one glass gob from the glass melt flow with the support member and moving it to the glass forming member.

Manufacturing Method 1-2 is characterized in that a support member approaches the front end of the nozzle, the front end of the glass melt flow is received by the support member, while supporting this front end, a constriction is made between the nozzle side and the support side of the glass flow melt, the support member is dropped to separate a glass gob from the glass melt flow at the constriction, the separated glass gob is then transferred to a glass forming member that is either stopped or moving, and, in the case where the glass gob is transferred to a stopped glass forming member, the time during which the glass forming member is stopped for transfer of the glass gob from the support member to the glass forming member is made shorter than the time required for one cycle of preparing one glass gob from the glass melt flow with the support member and moving it to the glass forming member.

Manufacturing Method 1-3 is characterized in that a support member approaches the front end of the nozzle, the front end of the glass melt flow is received by the support member, while supporting this front end, a constriction is made between the nozzle side and the support side of the glass flow melt, support is removed from the support member to separate a glass gob from the glass melt flow at the constriction, the separated glass gob is then transferred to a glass forming member that is either stopped or moving, and, in the case where the glass gob is transferred to a stopped glass forming member, the time during which the glass forming member is stopped for transfer of the glass gob from the support member to the glass forming member is made shorter than the time required for one cycle of preparing one glass gob from the glass melt flow with the support member and moving it to the glass forming member.

Mode 2 of the method of manufacturing glass articles of the present invention is a method of manufacturing glass articles in which glass gobs are continuously separated from a glass melt flow continuously flowing from a nozzle and the separated glass gobs are molded by intermittently or continuously moving forming members.

Manufacturing Method 2-1 is characterized in that the step of the support member receiving the front end of the glass melt flow and the support member being dropped more rapidly than the flow rate of the glass melt flow to separate the glass gob is repeated once in a fixed cycle period; the separated glass gob is transferred from the support member to a stopped or moving glass forming member to mold a glass article; and in the case where the glass gob is transferred to a stopped glass forming member, the period during which the glass forming member is stopped for transfer of the glass gob from the support member to the glass forming member is made less than or equal to 70 percent of the above cycle period.

Manufacturing Method 2-2 is characterized in that the step of the support member receiving the front end of the glass melt flow, forming a constriction between the nozzle side and the support member side of the glass melt flow while supporting the front end, and dropping the support member to separate the glass gob from the glass melt flow at the constriction is repeated once in a fixed cycle period; the separated glass gob is transferred from the support member to a stopped or moving glass forming member to mold a glass article; and in the case where the glass gob is transferred to a stopped glass forming member, the period during which the glass forming member is stopped for transfer of the glass gob from the support member to the glass forming member is made less than or equal to 70 percent of the above cycle period.

Manufacturing Method 2-3 is characterized in that the step of the support member receiving the front end of the glass melt flow, forming a constriction between the nozzle side and the support member side of the glass melt flow while supporting the front end, and removing support from the support member to separate the glass gob from the glass melt flow at the constriction is repeated once in a fixed cycle period; the separated glass gob is transferred from the support member to a stopped or moving glass forming member to mold a glass article; and in the case where the glass gob is transferred to a stopped glass forming member, the period during which the glass forming member is stopped for transfer of the glass gob from the support member to the glass forming member is made less than or equal to 70 percent of the above cycle period.

FIG. 1 is a schematic lateral view of an example of the glass article forming device employed in Manufacturing Methods 1-1, 1-2, 1-3, 2-1, 2-2, and 2-3. An example of Manufacturing Methods 1-1, 1-2, and 1-3 will be described below with reference to FIG. 1. First, glass (melt) that has been refined and homogenized by melting in a melting furnace (not shown) is caused to continuously flow at a constant flow rate out of the front end of a temperature-regulated nozzle 1 made of platinum or a platinum alloy. The preferred viscosity of the glass is 3 to 100 dPa·s, preferably 3 to 80 dPa·s.

A support member 2 is positioned directly beneath the nozzle and a gob of glass melt of a certain weight is separated from the glass melt flow. Specifically, in Manufacturing Method 1-1, support member 2 approaches the front end of nozzle 1, the front end of the glass melt flow is received by support member 2, and support member 2 is dropped more rapidly than the flow rate of the glass melt flow to separate a glass gob 6 from the glass melt flow. In Manufacturing Method 1-2, support member 2 approaches the front end of nozzle 1, support member 2 receives the front end of the glass melt flow, a constriction is formed between the nozzle side and the support member side of the glass flow melt, and support member 2 is dropped to separate glass gob 6 from the glass melt flow. In both Manufacturing Methods 1-1 and 1-2, the separated glass gob 6 is transferred from support member 2 to glass forming member 3 to mold a glass article 7. Specifically, separated glass gob 6 is transferred to a glass forming member 3 of concave portion provided on upper part of each of forming dies positioned at equal intervals on an index table 5, and while moving glass forming member 3, formed on glass forming member 3 into glass article 7. The material of glass forming member 3 may be a heat-resistant metal such as stainless steel, carbon, or the like.

In Manufacturing Method 1-3, support member 2 approaches the front end of nozzle 1, support member 2 receives the front end of the glass melt flow, a constriction is formed between the nozzle side and the support member side of the glass melt flow while supporting the front end, and support is removed from support member 2 to separate glass gob 6 from the glass melt flow at the constriction. In Manufacturing Method 1-3, the separated glass gob 6 is transferred to a stopped or moving glass forming member 3 to form a glass article.

Contact between the glass and the glass forming member is prevented to the extent possible during forming to obtain glass articles having high-quality surfaces, such as press-molding preforms for making optical elements. Thus, a configuration in which narrow slits are provided in the glass forming member or a porous material is employed for the glass forming member and gas is blown through the slits or pores to exert air pressure against the glass and mold the glass while it is floating (float forming) is desirable.

The glass gob 6 that is transferred to glass forming member 3 is at a lower temperature than when flowing out of the nozzle, but it is still a high temperature and there is a risk of fusion. Thus, the temperature of glass forming member 3 is desirably kept to less than or equal to 300° C. to reliably prevent fusion. It is also possible to provide a film such as a diamond-like carbon film on the surface of the glass forming member to prevent fusion. Glass forming members may be provided in multiple locations on a single forming die. In that case, movement of the glass forming member may comprise rotation of the forming die, for example, in addition to rotation of the index table.

Index table 5 intermittently or continuously moves glass forming member 3 to convey glass forming member 3 to the position where it receives the glass gob and removes glass forming members that have received glass gobs from the receiving location. The indexed rotation of this table successively conveys the glass forming members on the table to the glass glob receiving location and removes them once glass gobs have been received. Glass forming members 3 are positioned at equal intervals on table 5 so that they are moved to prescribed positions by constant indexed rotation.

The glass gob is formed into a prescribed shape on the moving glass forming member and then cooled to obtain a glass article 7 such as a preform for press molding. After being cooled to a temperature at which glass deformation does not occur (based on the glass transition temperature), a pick-and-press unit 4 is employed to pick up the glass articles 7 by aspiration from glass forming member 3 and move them to a pallet 8. Pallet 8 is heated from above, for example, by a heater 9 to gradually cool the glass articles. The conveyance of the glass articles from the glass forming members and their subsequent gradual cooling requires that care be exercised not to scratch the glass surface. Thus, when the glass articles are being conveyed from the forming die by a vacuum pad, the height is adjusted to that the glass articles are not pressed down onto the glass forming members by the pads, and a vacuum is generated at a distance adequate to prevent contact with the glass articles. During conveyance to a pallet for gradual cooling, the glass articles are transferred to the pallet without pressing down on them, and it is desirable to continuously clean the interior of the pallet so that no matter harder than the glass is ever present.

Figure 2:
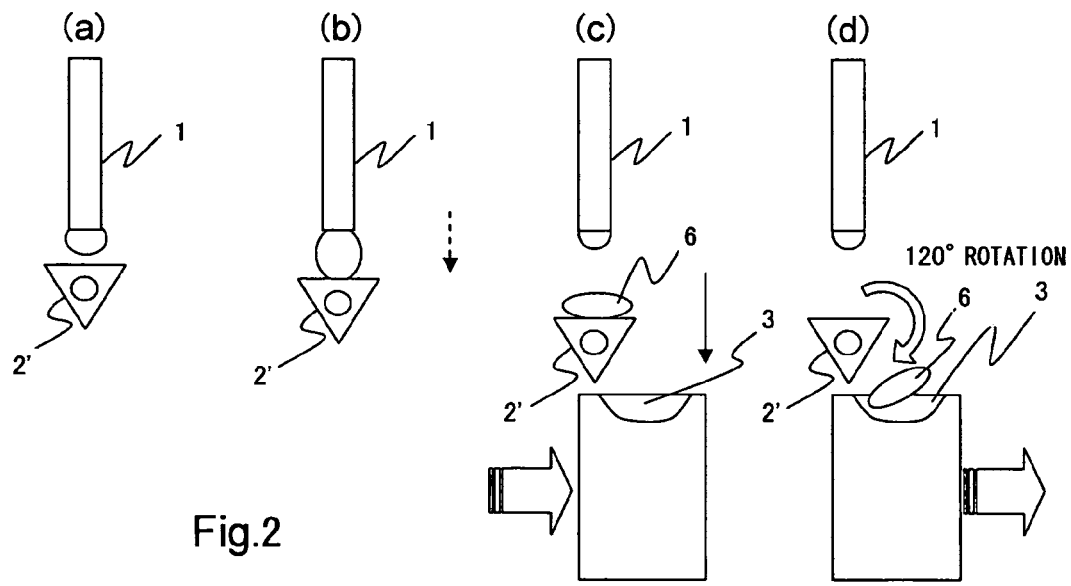
FIG. 2 is a schematic lateral view descriptive of the operation of the support member in the glass article forming device employed in the manufacturing method of the present invention.

FIG. 2 shows an example of the operation of the drop cutting machine with support member for separating glass gobs from the glass melt flow. The separation of the glass gob by the support member will be described next with reference to FIG. 2. Support member 2' is equipped with three "glass-receiving surfaces." That is, the support member is a triangular rod, the bottom surface of which forms an equilateral triangle. While maintaining the center axis of the triangular rod horizontal, the support member moves vertically and rotates to an angle of 120° and angles that are whole multiples of 120° about the center axis. It is also possible to cause cooling water to flow through the interior of the support member to prevent the glass melt from fusing to the support member. For example, the temperature of the support member desirably falls within a range of from 30 to 500° C., preferably 30 to 300° C. Further, the surface receiving the glass is desirably mirror finished in a shape that is either flat or partially indented to receive the glass melt.

The operation is described next.

As shown in (a), the first of three glass-receiving surfaces is caused to face upward and, while in a horizontal state, support member 2' is raised vertically, brought to within a certain distance of the front end of nozzle 1, and stopped.

(b) The front end of glass melt flow 6 flowing out of nozzle 1 then rides on the glass-receiving surface. In this state, a constriction forms between the nozzle side and the support member side of glass melt flow 6.

(c) Then, with the glass-receiving surface still being maintained horizontal, support member 2' is dropped vertically downward faster than the flow rate of the glass melt to separate the front end portion of the glass melt. Alternatively, with the glass-receiving surface still being maintained horizontal, support member 2' is either dropped or the support is removed, causing the front end portion to separate from the glass melt flow at the constriction. This yields a glass melt gob 6 of prescribed weight on the glass-receiving surface. It is also possible to gradually drop the support member at a rate slower than the dropping rate during separation so that the glass melt does not wet upward the area around the front end of the nozzle once the front end of the glass melt flow has been received on the glass-receiving surface.

(d) Support member 2 is then rotated 120° about the horizontal axis (about the internal axis of the equilateral triangle of the above vertical cross-section) to cause glass gob 6 to drop off the glass-receiving surface, transferring it to the glass forming member. This drop turns the glass gob upside down. In the course of introducing the glass gob into glass forming member 3, the glass is at a temperature equal to or greater than its softening point, providing an adequate viscosity range for molding. The glass melt flow is desirably separated by controlling the distance from the front end of the nozzle to the glass-receiving surface, the glass flow rate, and the timing of the dropping of support member 2' so that the weight of glass gob 6 remains constant.

The second glass-receiving surface of support member 2' is horizontal after support member 2' has been rotated 120° and is raised in the same manner as above while in that state. It is brought to within the above-stated distance of the front end of the nozzle, and the above-described glass gob separation step is repeated. In this manner, the support member is rotated in increments of 120°, and glass gobs 6 of prescribed weight are transferred to glass forming member 3 for the forming of glass articles.

The shape of the above-described support member is not limited to that of a triangular rod. It may be a regular square rod, regular pentagonal rod, some other regular polygonal rod, or even flat. In the case of a regular n-polygonal rod (n being an integer of not less than 3), the rotation angle of the support member is an integer multiple of 360°/n. When flat, it can be 180° or 360°. When a regular polygonal rod, the side surfaces can be glass-receiving surfaces, and when flat, the front and rear surfaces can each be used as a glass-receiving surface. A heat-resistant metal such as stainless steel, for example, is desirably employed as the support member.

Further, the support member can be a flat surface receiving a glass gob such that by rotating the flat surface 360° the glass gob is transferred to the glass forming member.

It is also possible for the support members to be gradually moved horizontally in the course of receiving the glass melt flow so that the glass melt flow is received and separated by different surfaces of the support member for two consecutively prepared glass gobs. For example, it is possible for the support members to be gradually and cyclically moved in a horizontal direction so that the same surface receives glass melt flow once every two to ten times. Compared to the glass melt flow being constantly received by the same surface, it is possible to more readily avoid adhesion and deposition of volatile components of the glass on the surface of the support member receiving the glass melt flow, thus advantageously enhancing glass quality.

The above support member is moved vertically and rotated to load the separated glass gob on the glass forming member. However, the support member employed in the method of the present invention is not limited to such movement and rotation; it suffices for the support member to be configured so that glass gobs of prescribed weight are separated without cutting by a cutting blade from the glass melt flow and transferred to the glass forming member.

Figure 3:
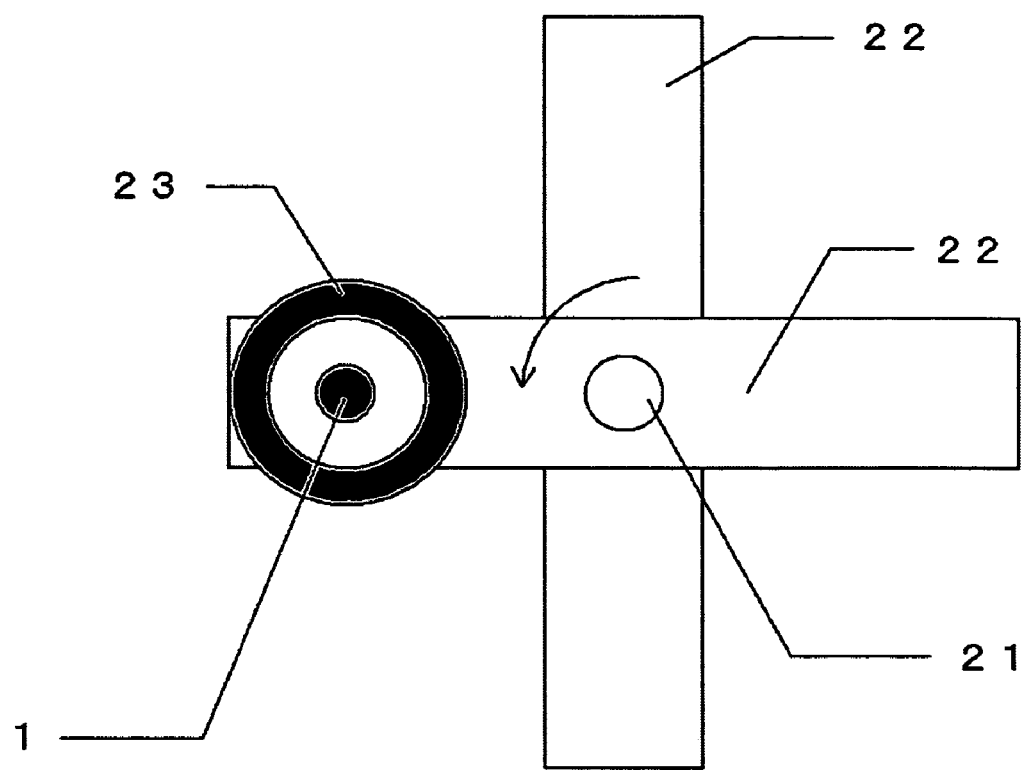
FIG. 3 is a schematic plan view descriptive of the operation of the support member in the glass article forming device employed in the manufacturing method of the present invention.

Another method of separating glass gobs and loading (moving) them onto the glass forming member is for the support member to be moved vertically to separate the glass gobs. In this method, as shown in FIG. 3, multiple support members 22 are positioned radially and at equal intervals about a vertically oriented rotating shaft 21. Rotating shaft 21 is rotated to move multiple support members 22 horizontally together. To separate glass melt gobs, the rotating shaft is rotated by a prescribed angle, causing one of support members 22 to remain vertically beneath nozzle 1. Next, support member 22 is raised to within a prescribed distance of the front end of the glass flow, with the front end of the glass melt flow being received by flowing onto the upper surface of the support member. When the front end of the glass melt flow has been supported by the support member, a constriction forms between the nozzle side and the support member side of the glass melt flow. When the support member is dropped at a prescribed timing and pulled rapidly away from the nozzle, the front end of the glass melt flow 6 can be separated at the constriction.

Figure 4:
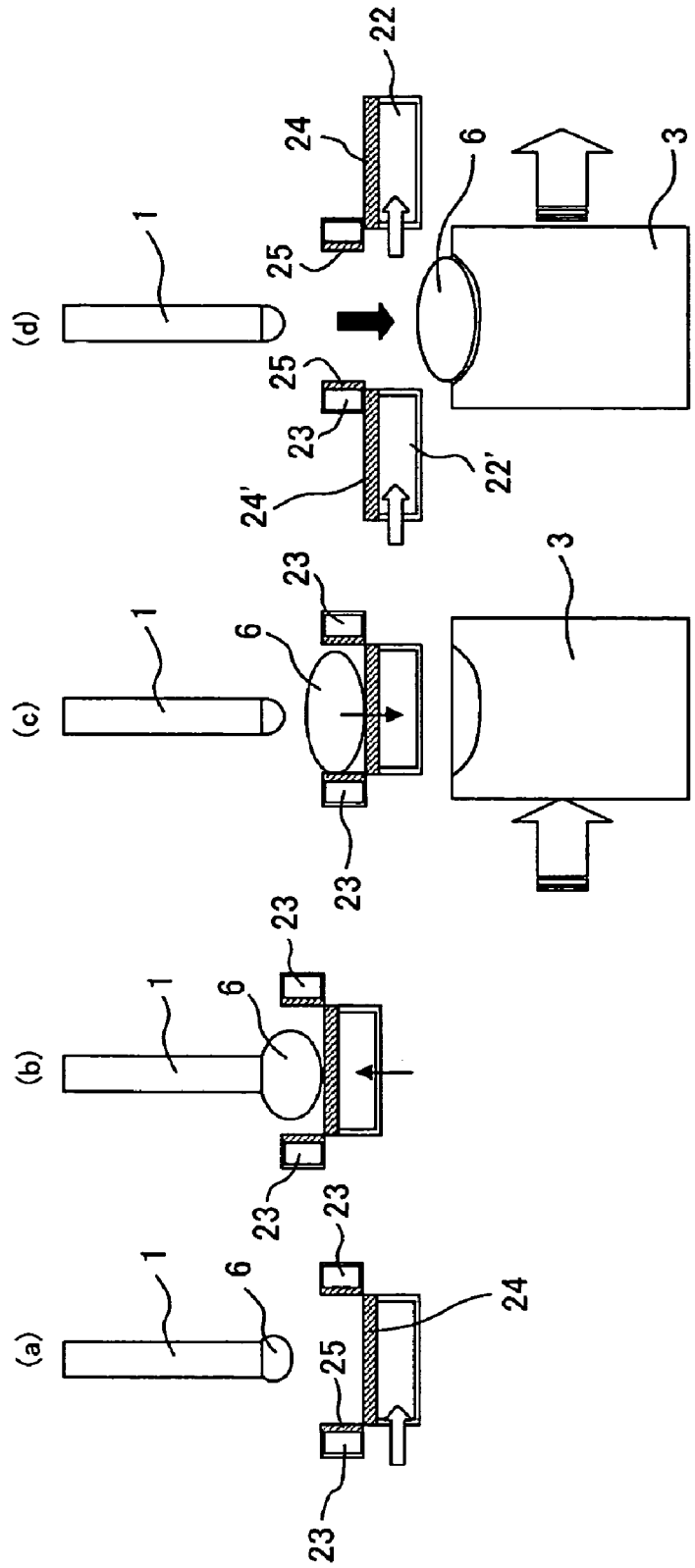
FIG. 4 is a schematic lateral view descriptive of the operation of the support member in the glass article forming device employed in the manufacturing method of the present invention.

The description of this state will be continued with reference to FIG. 4.

As shown in (a), the glass outer circumference support surface 25 and the glass-receiving surface 24, comprised of a porous substance through which nitrogen gas is made to flow, of support member 22 are positioned directly beneath nozzle 1. (b) The front end portion of glass melt flow 6 flowing out of nozzle 1 rides on glass-receiving surface 24. Glass-receiving surface 24 is dropped vertically at a speed greater than the flow rate of the glass melt to separate the front end portion of the glass melt flow. This yields a glass melt gob 6 of prescribed weight on glass-receiving surface 24. While the front end of the glass melt flow is present on the receiving surface, the support member may be slowly lowered at a speed lower than the dropping speed during separation so that the glass melt does not wet upward the front end of the nozzle. (d) Next, glass-receiving surface 24 is quickly slid in a horizontal direction without displacing glass outer diameter support surface 25. Glass gob 6 is transferred without inversion to forming member 3 that has been moved directly beneath the nozzle. The glass-receiving surface 24' of support member 22' is then moved directly beneath nozzle 1 to receive the next glass gob. A high-speed device can be achieved by providing multiple glass-receiving surfaces. When glass is not being received, volatile material adhering to the porous member is desirably removed.

Glass gob-receiving surface 24 may also be of a porous material. When the weight of the glass gob exceeds 1,000 mg, defects such as fold deformation and the like tend to occur during inversion from the support member. Such defects can be prevented by employing a porous material for the glass-receiving surface, floating the glass gob on nitrogen gas or the like, and transferring the glass gob that has been cut to a prescribed weight to a die directly below without inversion.

The outer diameter of the separated glass melt gob of prescribed weight is controlled by a guide 23 having an outer diameter holding surface. The outer diameter of glass melt gob 6 is desirably made either equal to or smaller than the diameter of the glass gob that is to be molded. This is because when the outer diameter of the glass melt gob is greater than the outer diameter of the glass gob, there is a possibility of the glass melt gob bulging out of glass gob molding member 3 during introduction into the glass gob forming member. The above guide moves vertically at a position beneath the nozzle, but does not move horizontally. Accordingly, when the support member upon which the glass melt gob has been loaded is moved horizontally, the glass melt gob is blocked by the guide from moving horizontally, causing it to drop vertically from the support member into a glass gob forming member waiting below, where the glass gob is formed.

These steps are repeated and glass melt gobs are separated one after another and transferred to the glass gob forming member to produce glass gobs. For reliable reception of dropping glass melt gobs by the glass gob forming member, it suffices for rotation of the rotating shaft to be synchronized with the timing of the transfer of the glass gob forming member, the glass gob forming member being positioned vertically beneath the nozzle when the rotating shaft is rotated.

In the above method, the support member is temporarily lifted from its resting position to receive and support the front end of the glass melt flow, and then dropped to separate the glass. However, it is also possible to separate the glass melt gob without vertically moving the support member. In that case, the guide member is not displaced vertically, but is fixed at a position beneath the nozzle. The support member is moved vertically beneath the nozzle and temporarily stopped, supporting the front end of the glass melt flow. Next, at a prescribed timing, the support member is rapidly moved horizontally to remove support from the front end of the glass melt flow, separating the front portion from a constriction in the glass flow melt and dropping it into the glass gob forming member.

These methods afford the advantages of not imparting defects such as folds in the glass because the separated glass melt flow is dropped vertically down to transfer it to the glass gob forming member. Folding tends to occur when the glass gobs increase in size; the application of the above methods is thus particularly desirable in the forming of glass gobs greater than or equal to 1,000 mg in weight.

In the above-described methods, it is not necessary to employ multiple support members, it being sufficient for at least one support member to be mounted about a rotating shaft. However, the use of multiple support members permits cleaning of the surface of the support member receiving the glass during operation of the device. Such cleaning removes adhering volatile matter from the glass.

In Manufacturing Methods 1-1, 1-2, and 1-3, the time during which the glass forming member is stopped for transfer of the glass gob from the support member to the glass forming member is made shorter than the time required for one cycle of preparing a glass gob from the glass melt flow with a support member and transferring it to the glass forming member. Alternatively, the time for transferring the glass gob from the support member to the glass forming member is made shorter than the time required for one cycle of preparing a glass gob from the glass melt flow with a support member and transferring it to the glass forming member. In this case, there is no need to stop the glass forming member. In the conventional method of preparing a glass gob from the glass melt flow, the time during which the glass forming member is stopped to let the glass forming member receive the glass gob is made equal to the time required for preparing a glass gob from the glass melt flow. By contrast, in Manufacturing Method 1 of the present invention, the time during which the glass forming member is stopped is made shorter than the time required for one cycle of preparing a glass gob and transferring it to the glass forming member. As a result, it becomes possible to reduce the time employed to move the glass forming member, preventing horizontal acceleration and improving the quality of the formed glass product.

Preferably, the time during which the glass forming member is stopped for transfer of the glass gob from the support member to the glass forming member, or the time during which the glass gob is transferred from the support member to the glass forming member, is made shorter than the period from the start of the raising of the support member to completion of separation of the glass gob. For example, the stop time can be made zero; that is, the glass gob can be introduced into the glass forming member while the latter is moving. In that case, the speed at which the glass forming member moves when introducing the glass gob can be made slower than in other cases.

Based on Manufacturing Methods 1-1, 1-2, and 1-3, since the glass forming member need not directly receive the front end of the glass melt flow, the time required for stopping (the stopping time) when receiving the glass gob can be shortened. Since the maximum displacement speed of the glass forming member can be reduced, the horizontal acceleration exerted on the glass during forming can be diminished, maintaining highly efficient production of high-quality glass formed products.

In Manufacturing Method 2-1, the step of receiving the front end of the glass melt flow by a support member and dropping the support member more rapidly than the flow rate of the glass melt flow to separate the glass gob is repeated once in a fixed cycle period (sometimes referred to as the "cutting time"). This step is conducted in the same manner as in Manufacturing Method 1-1 described with FIGS. 1 and 2.

In Manufacturing Method 2-2, the step of receiving the front end of the glass melt flow by a support member, supporting this front end to form a constriction between the nozzle side and the support side of the glass melt flow, and dropping the support member to separate the glass gob from the glass melt flow at the constriction is repeated once in a fixed cycle period (sometimes referred to as the "cutting time"). This step is conducted in the same manner as in Manufacturing Method 1-2 described with FIGS. 1 and 2.

In Manufacturing Method 2-3, the step of receiving the front end of the glass melt flow by a support member, supporting this front end to form a constriction between the nozzle side and the support side of the glass melt flow, and removing support from the support member to separate the glass gob from the glass melt flow at the constriction is repeated once in a fixed cycle period (sometimes referred to as the "cutting time"). This step is conducted in the same manner as in Manufacturing Method 1-3 described with FIGS. 1 and 2.

In Manufacturing Methods 2-1, 2-2, and 2-3, the time during which the glass forming member is stopped for transfer of the glass gob from the support member to the glass forming member or the time during which the glass gob is transferred from the support member to the glass forming member is made less than or equal to 70 percent of the cutting time. Desirably, the time during which the glass forming member is stopped or the time for transfer of the glass gob from the support member to the glass forming member is made less than or equal to 50 percent of the cutting time.

The stopping time can be made zero; that is, the glass gob can be introduced into a moving glass forming member. In that case, the speed at which the glass forming member moves when introducing the glass gob can be made slower than in other cases.

Based on Manufacturing Methods 2-1, 2-2, and 2-3, since the glass forming member need not directly receive the front end of the glass melt flow, the time required for stopping (the stopping time) when receiving the glass gob can be shortened. Since the maximum displacement speed of the glass forming member can be reduced, the horizontal acceleration exerted on the glass during forming can be diminished, maintaining highly efficient production of high-quality glass formed products.

Elements common to Manufacturing Methods 1-1, 1-2, 1-3, 2-1, 2-2, and 2-3 will be described below.

The maximum horizontal acceleration exerted on the glass forming member is desirably limited so that the horizontal inertia exerted on the glass while on the glass forming member is less than or equal to 0.05 N.

The weight of the molded glass article is desirably from 100 to 3,000 mg, preferably from 100 to 1,000 mg. At less than 100 mg, since glass gobs can be obtained with good weight precision by the dripping method, the method of the present invention is not applied. However, application of the method of the present invention to the forming of glass articles of less than 100 mg is not precluded. Further, when the weight of the glass article exceeds 1,000 mg, fold distortion and other defects tend to occur when the glass gob is inverted when being transferred from the support member to the glass forming member. This phenomenon is particularly marked when the weight of the glass article exceeds 3,000 mg. When 3,000 mg is exceeded, the glass assumes an oblate form on the glass-receiving surface due to its own weight, and it tends to be difficult to mold a desired shape with the glass forming member.

The rate of production of glass articles per unit time is desirably from 20 to 100 DPM (number produced per minute per nozzle), preferably 20 to 80 DPM.

The amount of glass pulled in the above-described method is desirably from 1 to 50 kg/day, and the preferred flow rate of the glass melt is 1 to 15 mm/sec.

The number of glass forming members positioned on the index table is, for example, from 6 to 48. The glass forming members are desirably positioned at equal intervals in a circle around the axis of rotation of the table. The diameter of this circle is, for example, from 300 to 500 mm.

When introducing glass gobs onto moving glass forming members without stopping the glass forming members, the glass gobs are desirably introduced along the direction of displacement of the glass forming members. More specifically, it is desirable to both incline the surface of the support member receiving the glass gobs to cause the glass gobs to drop and thus be transferred onto the glass forming members, and to match the direction in which the glass gobs drop to the direction of motion of the glass forming members. This makes it possible to obtain glass gobs of stable shape.

In the course of transferring the glass gob from the support member to the glass forming member, it is possible to flip over the glass gob. In that case, the glass gob is flipped over by rotating the support member, with the bottom surface of the glass gob that has been preferentially cooled on the support member becoming the upper surface on the glass forming member. Thus, in the glass forming member, the opposite surface from the previously preferentially cooled surface is preferentially cooled. As a result, since the glass gob is uniformly cooled, the temperature distribution between the upper and lower surfaces is reduced during the cooling process and the cooling rate is increased, advantageously permitting the forming of glass articles with little distortion.

When the front end of the glass melt flow is directly received by the support member or the separated glass melt gob is directly supported on the support member, the thermal energy of the glass is rapidly dissipated to the support member by thermal conduction, and wrinkles sometimes form on the surface of the preform. Such wrinkles are particularly problematic in preforms for precision press molding. Although the prevention of rapid cooling of the glass by raising the temperature of the support member is conceivable, this presents the risk of fusion of the glass to the support member. To prevent the generation of such wrinkles, it suffices to blow a gas through the surface of the support member receiving the glass and shorten the duration of direct contact between the glass melt and the support member, or ensure that the two never come into direct contact.

Accordingly, when gas spray outlets are provided in the surface of the support member receiving the glass, gas is fed through gas passages in the support member to the spray outlets and blown, and gas pressure is exerted on the glass to shorten the duration of direct contact between the glass melt and the support member or ensure that the two never come into direct contact, it is possible to eliminate wrinkles that would appear were no gas blown. Excessive gas blowing overcools the glass and blows gas against the nozzle, becoming a major factor in preventing stable glass melt outflow. Accordingly, the amount of gas blown out may be suitably adjusted within a range that achieves the above-stated objects but does not cause the above-stated problems.

The method of blowing gas out through the support member may be adopted in any of Manufacturing Methods 1-1, 1-2, 1-3, 2-1, 2-2, and 2-3. It may also be applied to the method of horizontally displacing the support member, removing support from the front end of the glass melt flow, and separating the glass melt gob.

When employing the above-described guide in glass melt gob separation, gas spray outlets can be provided in the outer diameter holding surface, gas blown out, and direct contact between the outer diameter holding surface of the guide and the glass prevented or eliminated.

It is also possible to provide multiple fine holes in the surface of the support member receiving the glass or the outer diameter holding surface of the guide and blow gas through these holes. Alternatively, these surfaces can be formed of a porous material and gas blown through the porous material.

Based on the method of the present invention, in a method of forming glass of prescribed weight with a glass forming member in the form of a rotating index table, the separation of table rotation (that is, movement of the glass forming members and the glass materials from the operation of separating glass gobs from the glass melt flow makes it possible to avoid sharp acceleration and sharp deceleration of the table even when the flow rate of the glass melt is increased, for example. Thus, the glass gobs are subjected to a reduced horizontal acceleration and the glass gobs can be formed into good shapes, particularly shapes suited to preforms for press molding. The method of the present invention is particularly suited to float forming while reducing contact between the glass gob and the glass forming member.

Even when the flow rate of the glass melt is increased, there is an adequate margin for movement of the glass forming member. Since the stop time of the glass forming member can be decreased, the tact time can be greatly shortened.

In the method of the present invention, the glass article may be a preform of optical glass for press molding. The shape of preforms for press molding will be described. The preform shape is determined by the shape of the article being press molded. When press molding an axially symmetrical optical element such as a lens, the preform is also desirably axially symmetrical. For example, it may be spherical or marble-shaped (tabular). Further, gas is sometimes trapped between the pressing mold and the preform during press molding, causing a defect known as "gas trapping" where the gas inhibits the molding of the glass. Accordingly, taking this into account, the curvature of the preform surface is desirably more acute (greater) that the curvature of the molding surface of the pressing mold.

The present invention covers methods of manufacturing optical glass elements by heat softening glass articles, desirably preforms, obtained by the above-described manufacturing methods of the present invention, followed by press molding. More particularly, glass elements can be manufactured by reheating and then press molding in a pressing mold preforms for press molding comprised of optical glass that has been formed by the above-described methods and then gradually cooled. Prior to reheating, the preforms can be cleaned and dried as needed. Further, a film having a mold separation effect or a lubricating effect such as facilitating extension of the glass on the surface of the pressing mold may also be provided.

When the optically functional surface of the lens or the like is not going to be mechanically processed, precision press molding is desirably employed for the above press molding. In precision press molding, a mold of SiC, hard metal, heat-resistant metal, or the like may be employed. A pressing mold with a molding surface coated as needed with a carbon film, noble metal film, or some other mold separation film may be employed to conduct press molding in an atmosphere of nitrogen, a mixed gas of nitrogen and oxygen, or an inert gas. Following gradual cooling of the optical element that has been press molded, a thin optical film such as an antireflective film may be provided as needed.

Although the optical elements that can be molded by the above-described methods are not specifically limited, examples include aspherical lenses, spherical lenses, cylindrical lenses, macrolenses, lens arrays, and various other lenses, prisms, polygonal mirrors, and diffraction gratings.

The present invention (mode 3) is a method of manufacturing glass gobs in which glass gobs are formed out of a glass melt flowing from a nozzle.

Figure 5:
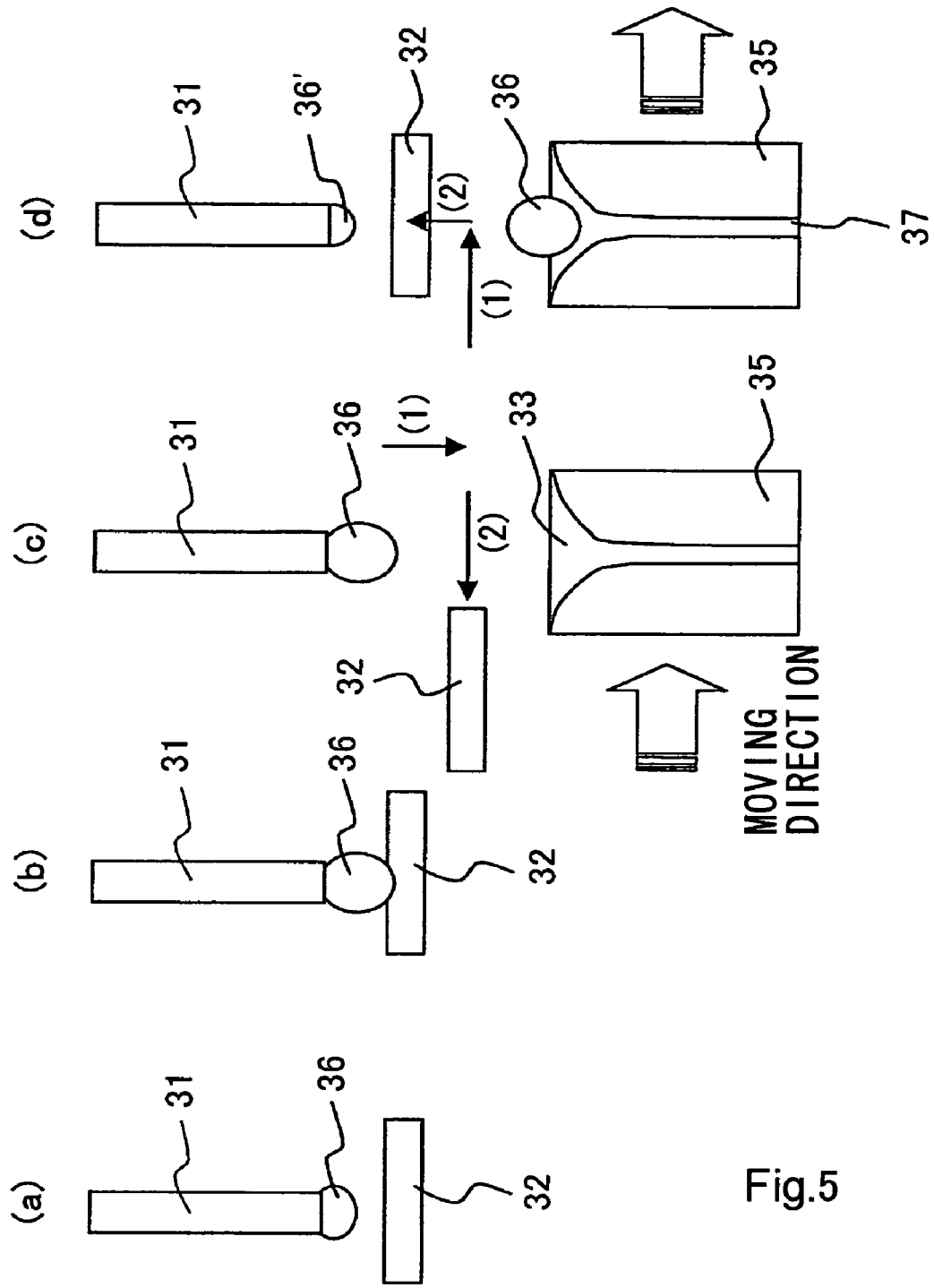
FIG. 5 is a schematic of the glass gob forming device employed in the present invention.

FIG. 5 is a schematic of a glass gob forming device employed in an implementation mode of the present invention. First, glass (melt) that has been clarified and homogenized by melting in a melting furnace (not shown) is made to continuously flow at a constant flow rate through a temperature-adjusted platinum or platinum alloy nozzle 31, as shown in FIG. 5(a). The viscosity of the glass is desirably 3 to 100 dPa·s, preferably 3 to 80 dPa·s.

The method of manufacturing glass gobs of the present invention is characterized in that, prior to dripping of the flowing glass melt from the nozzle, a support member is brought into contact with the lower edge portion of the glass melt flowing out of the nozzle. The support member is then dropped downward from the lower edge of the glass melt at a speed greater than the flow rate of the glass melt, thereby causing a glass gob of prescribed weight to drip downward onto the support member from the nozzle.

As shown in FIG. 5(b), support member 32, positioned directly beneath nozzle 31, is brought into contact with the lower edge portion of glass melt 36 flowing out of nozzle 31. Support member 32 is desirably made of a heat-resistant material maintained at a temperature at which fusion to the glass melt does not occur upon contact. Examples of desirable materials suitable for use in the support member are stainless steel and other heat-resistant metals. The lower edge portion of glass melt 36 flowing out of the front end of nozzle 31 comes into contact with the support member, and the glass melt that has contacted the support member is cooled through the lower edge portion by the support member, which is set to a temperature lower than the temperature of the glass melt.

Since the glass melt flows out continuously, the amount of glass melt at the front end of the nozzle increases continuously. However, since the glass melt is deprived of heat through its lower edge portion by contact with the support member, the glass viscosity increases more rapidly than when flowing out without coming into contact with the support member. Further, since the lower edge portion of the glass melt is supported by the support member, even when the glass weight exceeds the level that can be supported by surface tension, the glass does not drip, making it possible to form larger glass gobs.

When a certain amount of glass melt has flowed onto the support member, the support member is moved downward from the lower edge portion of the glass melt more rapidly than the flow rate of the glass melt. As a result, a glass gob of prescribed weight is caused to drip from the nozzle onto the support member.

Specifically, as shown in FIG. 5(c), when support member 1 is pulled vertically downward from the lower edge portion of glass 36, the support member provides no more support and the glass viscosity decreases, causing the glass to drip. Adjusting the timing at which the support member is pulled away makes it possible to adjust the timing at which the glass drips. Thus, the weight of the dripping glass can be set by means of the timing of pulling away the support member. Further, delaying the timing of pulling away the support member makes it possible to obtain a larger glass gob than can be obtained by natural dripping. Still further, even when there is some variation in the distance between the nozzle and the support member when the support member receives the lower edge portion of the glass melt, pulling away the support member at a constant timing affords the advantage of dripping glass of constant weight.

Although the glass melt is cooled by contact with the support member, cooling due to contact with the support member affords the advantage of making it possible to maintain a constant glass flow rate since the nozzle temperature can be kept constant, in contrast to the method of cooling by blowing gas onto the gas. In the method of cooling by blowing gas, gas is blown onto both the glass and the nozzle, making it difficult to maintain a constant nozzle temperature. In the method of cooling by contact with the support member, there is almost no effect on the nozzle. To conduct more aggressive cooling by contact with the support member, a coolant such as water may be circulated through the support member, for example. The temperature of the support member contacting the glass melt is desirably from 30 to 500° C., preferably from 30 to 300° C., for example. The glass-receiving surface of the support member is desirably mirror finished, and of a shape that is flat or indented where the glass melt is received.

Pulling away the support member both removes contact with the support member and causes heat from the other portion of the glass gob to propagate, causing the temperature of the lower edge portion of the glass to instantaneously rise. As a result, the viscosity (temperature) of the dripping glass gob is rendered uniform. The glass melt on the support member assumes an oblate shape due to its own weight, but the pulling operation causes the viscosity to nearly instantaneously become uniform. Thus, the glass gob that has been separated from the front end of the nozzle either assumes a spherical shape or returns to a drop shape and drops. Accordingly, the shape of the glass gob droplet is nearly spherical. Spherical glass gobs are readily formed.

In the state shown in FIG. 5(b), while still in contact with the bottom edge portion of the glass, the support member is gradually moved vertically downward in the direction of flow of the glass melt, making it possible to prevent wetting of the perimeter of the nozzle by the glass melt. Preventing wetting of the perimeter of the nozzle by the glass is advantageous in that it prevents variation in the weight of the glass gobs and the generation of striae.

When moving the support member downward as shown in FIG. 5(c), the support member is desirably pulled away vertically beneath the nozzle. Thus, even when glass strands are pulled out between the glass droplet and the nozzle during glass dripping, the strands sever and are incorporated into the glass droplet, advantageously avoiding the generation of defects in the glass gob.

As shown in FIG. 5(c), following the pulling away operation ((1) in the figure), support member 32 begins to contact the glass 36 dripping from nozzle 31. Thus, for example, the glass gob that is horizontally withdrawing ((2) in the figure) drips, and is received by the glass forming member 33 of a glass gob forming die 35 that is waiting beneath the support member. After glass gob 36 drips, support member 32, as shown in FIG. 5(*d*), waits beneath nozzle 31 following operations (1) and (2), and receives another glass gob of prescribed weight. Support member 32 may also perform these operations in the sequence of (2) (moving upward) followed by (1) (moving in a horizontal direction).

In the pulling away operation ((1) in the figure) of FIG. 5(*c*), when the distance over which the support member is pulled away is too short, dripping does not occur, and when too long, the dripping distance increases and the glass gob strikes the support member heavily as it is being received; these are undesirable for the forming of well-shaped glass gobs. Accordingly, the pulling distance desirably falls within a range of from 2 to 20 mm.

In the pulling away operation ((1) in the figure), the support member is desirably moved downward so that there is temporarily no contact between the support member and the lower edge portion of the glass melt. Thus, the dropping speed of the support member is desirably one at which the glass that has been pulled away and is dropping no longer contacts the support member. The dropping speed of the support member thus desirably falls within a range of from 10 to 50 mm/s, for example.

Glass gob forming mold 35, provided with a glass forming member 33 receiving the glass gob on the upper portion thereof and having a concave portion for forming, waits beneath support member 32. The glass gob 36 is dropped from support member 32 to waiting glass gob forming die 35 ((d) in FIG. 5) and molded to a prescribed shape in the glass gob forming die.

Figure 6:
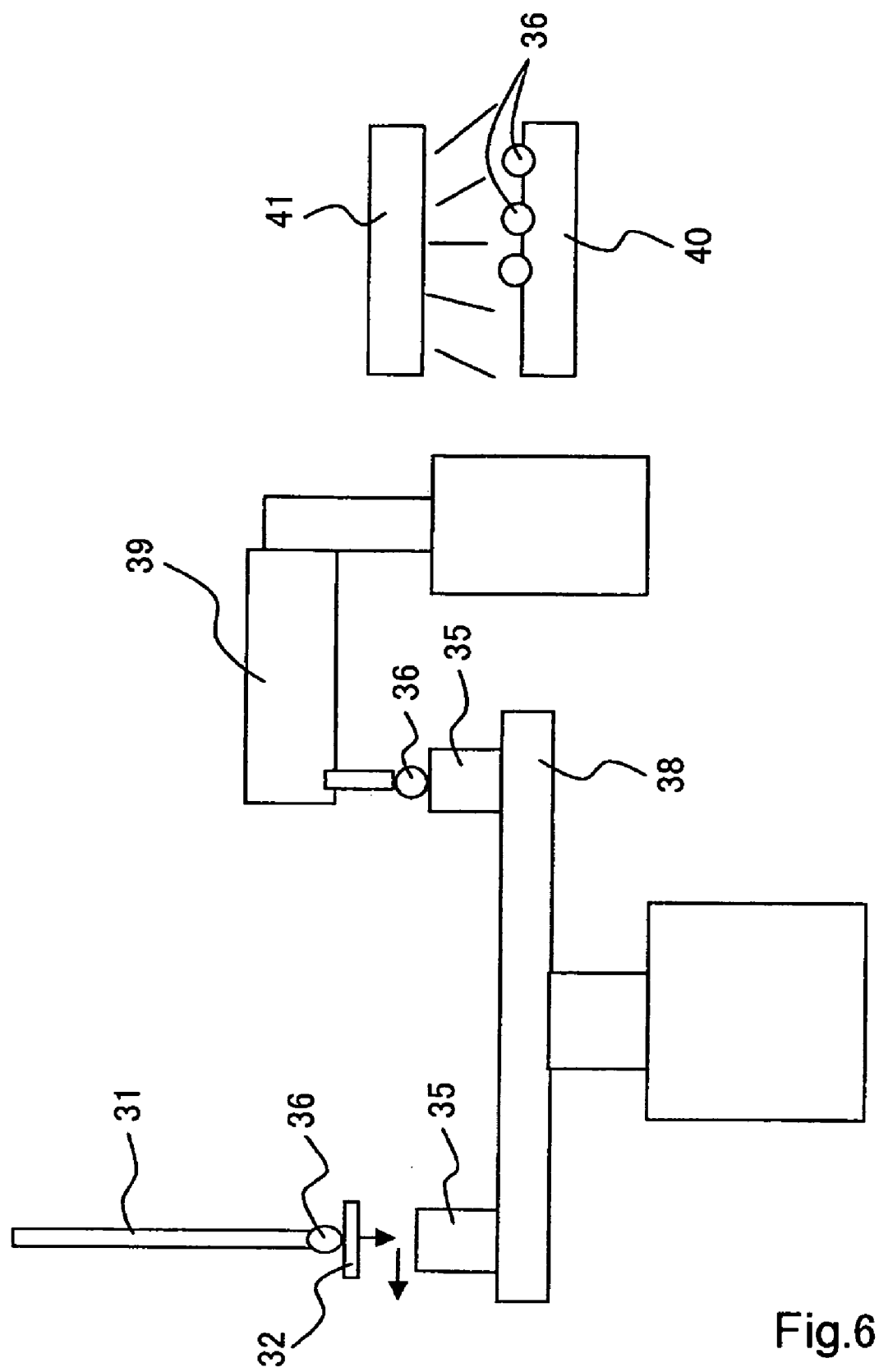
FIG. 6 is a full schematic of the glass gob forming device employed in the present invention.

FIG. 6 is a schematic of the overall glass gob pressing device.

Glass gob forming dies 35 are positioned on an index table 38 and move intermittently by means of indexed rotation of the table. Table 38 may also be continuously rotated, in which case the rotation speed of table 38 may be uniform or may change periodically. The glass gobs are cooled to close to the glass transition temperature during this movement, after which they are aspirated by pick-and-press unit 39, removed from the mold, and conveyed to pallet 40. To prevent damaging glass gobs 36 by heat shock, pallet 40 is desirably heated from above by a heater 41 to maintain a temperature suited to gradual cooling of the glass gobs.

In the device shown in FIG. 6, multiple glass gob forming dies 35 are arranged at equal intervals on index table 38. Indexed rotation of the table causes the glass gob forming dies to be successively sent to the glass dropping position (the left side of the index table in FIG. 6) and receive glass gobs from support member 32, as set forth above.

After transferring a glass gob 36 to glass gob forming dies 35, support member 32 is moved vertically upward into contact with the lower edge portion of the glass melt at the front end of the nozzle and the above-described operation is repeated ((d) in FIG. 5). During this time, the indexed rotation of the table causes glass gob forming die 35 to be conveyed away from the glass dropping position and the next glass gob forming die to be conveyed into the glass dropping position.

The number of glass forming members positioned on the index table may fall within a range of from 6 to 48, for example. The glass forming members are suitably disposed at equal intervals along a circle centered on the axis of rotation of the table. The diameter of this circle may fall within a range of from 300 to 500 mm, for example; however, this is not by way of limitation.

Based on the above method, as set forth above, with the goal of increasing the weight precision of the glass gobs, there is no necessity to precisely adjust the height of all of the glass gob forming dies on the table. This affords the advantage of permitting the manufacturing of glass gobs of highly precise weight with little burden.

The operations of raising and lowering the support member, dropping the glass from the support member onto the glass gob forming die, rotating the table in an indexed manner, and removing the glass gobs from the glass gob forming die are controlled with a sequencer. Each operation is repeated once during a fixed cycle period, permitting the successive forming of glass gobs of constant weight.

Since the weight precision of the glass gobs obtained by the manufacturing method of the present invention is high and striae and deformation can be prevented, the glass gobs are suitable for use as preforms in press molding. When employing the glass gobs as preforms, glass gobs that have been gradually cooled on a pallet can be cooled to room temperature, cleaned and dried as needed, and coated with a surface film as needed to enhance the mold separating property during pressing. In particular, when press molding optical elements, a glass starting material blended to yield desired optical characteristics in the final product is desirably melted, clarified, and homogenized to mold preforms comprised of optical glass.

To form glass gobs having high-quality surfaces such as press-molding preforms for making optical elements, it is desirable for the glass and glass forming member to come into as little contact as possible during forming. Thus, a glass gob forming die having fine holes in glass forming member 33, a glass forming die comprising gas blow outlets on the bottom thereof (referred to as a "venturi tube": numeral 37 in FIG. 5), or a glass gob forming die in which the glass forming members are configured of a porous substance is desirably employed to blow gas out through either the fine holes, gas blow outlets, or porous substance to exert wind pressure on the glass and form it while floating (referred to as "float forming"). The glass gob 36 that is dropped into glass forming member 33 has been cooled again on support member 32, causing the viscosity thereof to increase somewhat. Thus, even when gas is blown out to exert wind pressure on the glass and float it as set forth above, there is an advantage in that the blowing of the gas is never obstructed. Accordingly, the glass gob is readily dropped into the middle of the glass forming member.

Carbon, heat-resistant metals such as stainless steel, and the like can be employed in the glass gob forming die. The glass that is transferred to the glass forming member is at a lower temperature than when flowing out of the nozzle, but is still at a temperature where fusion is a risk. Thus, the temperature of the glass forming member is desirably set to less than or equal to 300° C. to reliably prevent fusion. Further, to prevent fusion, a film such as a diamond-like carbon film may be provided on the surface of the glass forming member. Multiple glass forming members may also be provided at different spots on a single forming die. In that case, movement of the glass forming member may be conducted by, for example, rotating the forming die in addition to movement by rotating the index table.

Although FIG. 5 shows a flat support member 32, the support member is not limited to being flat.

Figure 7:
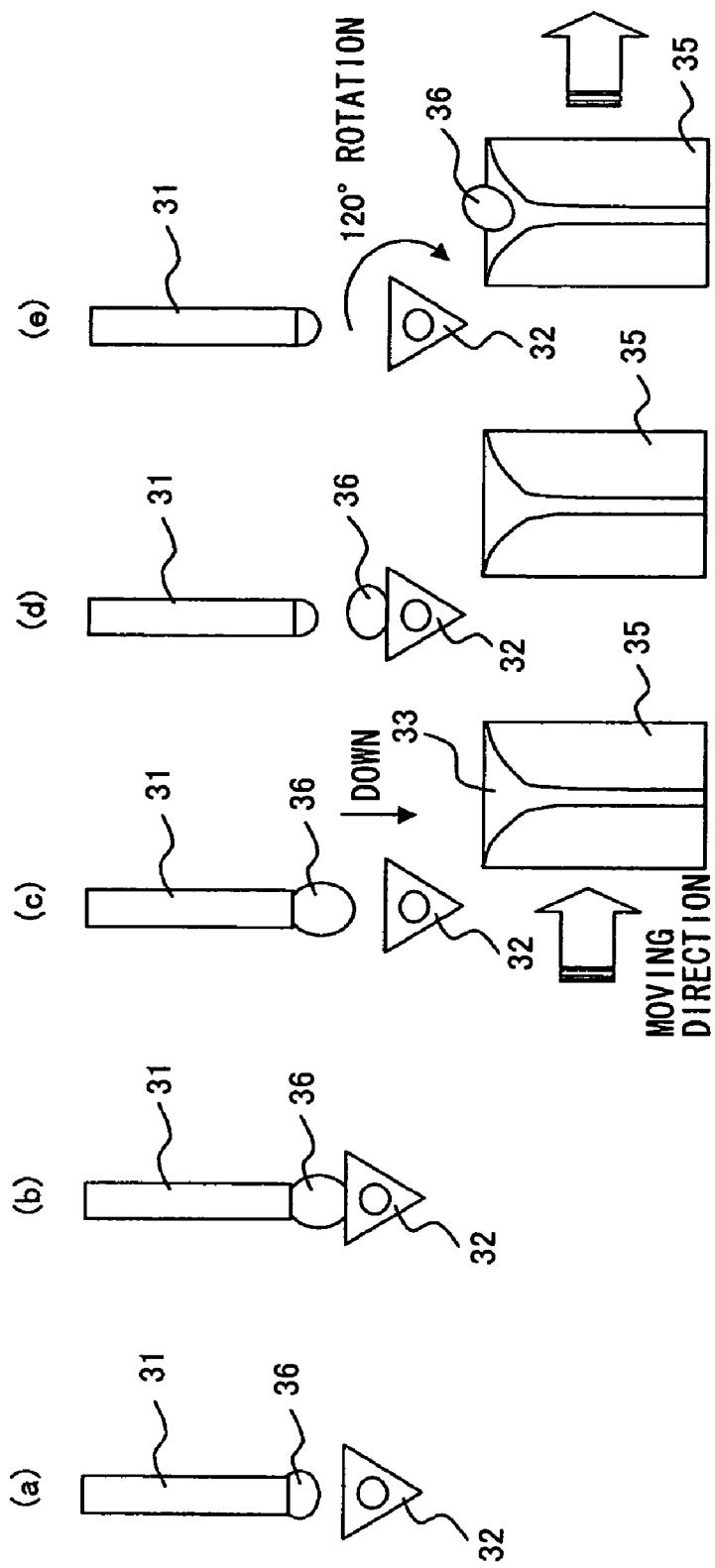
FIG. 7 is a schematic of the glass gob forming device employed in the present invention.

For example, the support member 32 shown in FIG. 7 is equipped with three glass-receiving surfaces and is in the form of a triangular rod with a bottom surface in the form of an equilateral triangle. This support member functions by moving vertically while keeping the center axis of the triangular horizontal, and rotating at an angle of 120° or some integer multiple thereof. Further, coolant can be made to flow through the interior of the support member to prevent the glass melt from fusing to the support member. The temperature of the support member, as stated above, is desirably from 30 to 500° C., preferably from 30 to 300° C. Further, the glass-receiving surface is desirably mirror finished and of a shape that is flat or indented where the glass melt is received.

The operation of the triangular rod-shaped support member will be described with FIG. 7.

First, support member 32 is raised vertically upward with the first of three glass-receiving surfaces facing upward in a horizontal state to within a certain distance of the front end of nozzle 31 and stopped (a). The lower edge portion of glass melt 36 flowing out of the nozzle comes into contact with the glass-receiving surface of support member 32. How long this contact continues can be suitably selected based on the weight setting of the glass gob. As set forth above, to prevent upward-wetting of the nozzle by the glass melt while the lower edge portion of glass melt 36 remains in contact with the glass-receiving surface of support member 32, support member 32 can be gradually lowered in the direction of outflow of the glass melt.

Next, the support member is pulled away (in the direction of the arrow in the figure) with the glass-receiving surface still horizontal so that the glass and the support member are no longer in contact (c). As a result, the temperature of the lower edge portion of glass melt 36 rises and a glass gob of prescribed weight drips off. By receiving the glass gob that has dripped off on support member 32 (d), the dripping glass gob can be reliably received even when the period from the start of contact between glass gob 36 and support member 32 to when glass gob 36 drips is short.

(c) is completed without a horizontal force being exerted on the glass at the front end of the nozzle by drawing support member 32 vertically downward. This is advantageous both in that it is possible to prevent deformation of the glass gob and in that any glass strands that are drawn out do not remain as defects in the glass gob.

Next, the support member is turned 120° about its horizontal axis (the inner center of the regular triangle of the vertical cross-section), dropping glass gob 36 from the glass-receiving surface into glass gob forming die 35 (e).

When the support member has rotated 120°, the second glass-receiving surface becomes horizontal. In that state, the above rising and approaching to within the above-stated distance of the front end of the nozzle take place, returning to state (a), and steps (a) through (e) are repeated. While rotating the support member in 120° increments in this fashion, glass gobs of prescribed weight can be transferred one after another to the glass forming member and the glass gobs formed.

The support member is not limited to a regular triangular rod shape. It may also be in the shape of a regular square rod, regular pentagonal rod, or some other regular polygonal rod, or even be flat. When a regular polygonal rod with n angles (n being an integer of not less than 3), the angle of rotation of the support member is an integer multiple of 360°/n. When a regular polygonal rod, the lateral surfaces are employed as the glass-receiving surfaces, and when flat, the outer surface and the rear surface, or either one of the two, may be employed as the glass-receiving surface.

When the support member is a regular triangular rod as set forth above, the glass gob can be transferred from the support member to the glass forming member simply by rotating the angular rod. Similarly, in the case of a regular square rod or a rod that has even more regular angles, simple rotation of the angular rod transfers the glass gob from the support member to the glass forming member. However, even when the support member is an angular rod, it is possible to combine vertical and horizontal movement of the angular rod with movement of the support member in the same manner as when the support member is flat.

The weight of the glass gobs manufactured by the manufacturing method of the present invention is not specifically limited. However, the weight is desirably set to within a range of less than or equal to 500 mg.

The glass employed in the manufacturing of the glass gobs of the present invention need only be capable of flowing at a constant flow rate out of the nozzle without devitrifying. However, in the manufacturing method of the present invention, glass gobs are suitably manufactured from glass in which the difference between the softening temperature and the glass transition temperature does not exceed 100° C. Such glass also has the property of changing sharply in viscosity with changes in temperature. Accordingly, in the method of continuously receiving the lower edge portion of glass melt flowing out of a nozzle while separating prescribed weights of glass, the viscosity of the separated glass becomes nonuniform, making it difficult to obtain good glass gobs. By contrast, in the manufacturing method of the present invention, even with such glass, it is possible to reduce the effect due to nonuniformity of viscosity when the support member is pulled away, increasing the viscosity of the lower edge portion of the glass. Further, the timing of the pulling away of the support member can be used to facilitate controlling the timing of dripping.

The production level of glass gobs per unit time is desirably 20 to 100 DPM (the number of units produced per minute per nozzle), with 20 to 80 DPM being preferred.

The amount of glass pulled in the method of the present invention is desirably from 1 to 20 kg/day, and the desirable flow rate of the glass melt is 1 to 15 mm/sec.

Based on the manufacturing method of the present invention, since a prescribed weight of glass is first received by the support member, it is unnecessary to stop the glass gob forming die (rotation of the index table) while the glass is being received by the nozzle. Accordingly, the present invention is suited to methods employing multiple glass gob forming dies and molding glass gobs on the forming molds while moving the forming dies.

Pulling the glass melt away from the support member reduces contact between the support member and the glass melt or results in a temporary state of no contact during that period. Thus, compared to when the glass melt is received by the forming die, the period of contact with the glass melt is shorter and the amount of volatile matter in the glass melt adhering to the glass-receiving surface of the support member can be reduced. When such volatile matter accumulates, it is eventually incorporated into the glass, compromising the quality of the glass gobs. However, the operation of pulling away the support member solves this problem.

When an angular rod is employed as the support member, the glass gob can be dropped onto the glass forming member without stopping the glass forming member. However, the rate of movement of the glass forming member is desirably lowered during dropping of the glass gob. In the course of dropping a glass gob onto a moving glass forming member, the glass gob is desirably dropped by rotating the support member of the angular rod in the direction of movement of the glass forming member.

In the present invention, the glass gob may be a preform for press molding. The shape of preforms for press molding will be described below.

The shape of a preform is determined by the shape of the article being press molded. When press molding axially symmetrical optical elements such as lenses, the preform desirably also has an axially symmetrical shape. Examples are spherical and marble-shaped (disk-shaped) articles. During press molding, problems known as gas trap defects sometimes occur due to gas trapped between the pressing mold and the preform that hinders molding of the glass. Accordingly, this point is desirably taken into account and the curvature of the surface of the preform is (increased) made greater than the curvature of the molding surface of the pressing mold.

The present invention includes methods of manufacturing optical elements, characterized in that a glass article obtained by the manufacturing method of the present invention, preferably a preform, is heat softened and then press molded.

More specifically, a preform for press molding made of optical glass that has been molded by the above-described method and then gradually cooled is reheated and press molded in a pressing mold to manufacture an optical element. The reheated preform can be washed and dried as needed. Further, a film having a mold separating effect or a lubricating effect to facilitate spreading of the glass on the surface of the pressing mold may be formed on the preform.

When not mechanically processing optically functional surfaces such as lens surfaces, precision press molding is desirably employed in the above press molding. In precision press molding, a mold material such as SiC, hard metal, heat-resistant metal, or the like may be employed. A pressing mold with a molding surface coated as needed with a carbon film, noble metal film, or some other mold separation film may be employed to conduct press molding in an atmosphere of nitrogen, a mixed gas of nitrogen and oxygen, or an inert gas. Following gradual cooling of the optical element that has been press molded, a thin optical film such as an antireflective film may be provided as needed.

Although the optical elements that can be molded by the above-described methods are not specifically limited, examples include aspherical lenses, spherical lenses, cylindrical lenses, macrolenses, lens arrays, and various other lenses, prisms, polygonal mirrors, and diffraction gratings.

EXAMPLES

The present invention is described in greater detail below through Examples.

Example 1

A glass starting material blended to finally yield desired optical characteristics such as refractive index, dispersion, and transmissivity was melted by heating, degassed, refined, and homogenized by stirring to obtain a glass melt. This glass melt was caused to continuously flow at a certain flow rate through a platinum alloy nozzle maintained at a controlled temperature. The amount of glass drawn was 10 kg/day and the flow rate was set to 2.5 mm/sec.

The glass melt flow was formed into preforms for press molding by the device shown in FIGS. 1 and 2.

The support member employed in the present Example was a triangular rod of stainless steel having a regular triangular bottom surface measuring 20 mm on a side. To prevent fusion between the support member and the glass melt, a hole 8 mm in diameter was formed in the center and cooling was conducted by passing water through this hole.

First, the drop cutting device in the form of the support member was raised to a position where the mirror-finished glass-receiving surface was 3 mm below the front end of the nozzle and stopped. In this state, the glass-receiving surface was maintained horizontal (with the glass-receiving surface facing the area vertically above it). Next, the front end portion of the glass melt flow exiting the nozzle was loaded onto the glass-receiving surface. Since the amount of glass melt present on the glass-receiving surface increased with time, the support member was lowered vertically at a rate of 1 mm/sec to prevent the glass melt from upward-wetting the perimeter of the front end of the nozzle.

When the glass melt had accumulated on the glass-receiving surface to where a glass melt gob of precise desired weight could be obtained, the support member was rapidly lowered at a rate 10 mm/sec faster than the flow rate of the glass melt to separate the front end side at a constriction in the glass melt flow formed due to surface tension of the glass, yielding a glass melt gob of prescribed weight on the glass-receiving surface. Next, the support member was rotated 120° about the center axis of the triangular rod, dropping the glass gob onto a glass-receiving member provided on the upper surface of a glass gob forming die waiting below the support member. The dropped glass gob rode on the glass forming member in a vertically inverted state and was float formed.

After separation of the glass melt gob, the drop cutting device repeated the operation of dropping a glass gob onto the glass forming member. The glass gob forming die reliably received glass gobs separated synchronously with the operation of the drop cutting device. The glass gobs entering the glass forming member were molded into preforms while being moved with the glass forming die, solidifying as they cooled over time. The solidified preforms were aspirated to remove them from the glass forming member and transfer them onto a pallet, where they cooled gradually. Successive preforms of prescribed weight were successively manufactured from glass melt continuously flowing out in this manner.

There were 12 glass gob forming dies positioned at equal intervals around a circle on the index table, with a single glass forming member provided on each die. The diameter of the circle was 400 mm.

The glass forming member was stopped for 1.0 sec at the glass gob receiving position, the period from the start of raising of the support member to the completion of separation of the glass gob was set to 1.5 sec, and the cutting time was set to 3.0 sec to manufacture preforms for press molding weighing 350±3 mg from optical glass. The preform forming rate was 20 DPM. The horizontal force exerted on the glass gobs on the glass forming members was a maximum of $5 \times 10^{-5}$ N. A sequencer was used to control devices including the drop cutting device and index table.

The preforms for press molding that were formed in this manner had rotational symmetry and exhibited no defects such as crizzles, cracks, or striae. The weight precision fully satisfied the requirements of precision press molding.

The surface of the support member receiving the front end of the glass melt flow can be comprised of a porous substance, and gas can be blown out through this surface to reduce contact between the glass and the support member.

To keep the weight precision of the preform within the above-stated range, three glass-receiving surfaces were adjusted so that the glass melt flow was received at the same height by each (to within 25 micrometers). Microadjustment of the vertical position of the glass gob forming mold was unnecessary.

Next, multiple support members having surfaces receiving the front end of the glass melt flow made of porous material were positioned at equal intervals around the axis of rotation as set forth above, a support member was raised to a position vertically beneath the nozzle, the front end of the glass melt flow was supported, and the support member was rapidly lowered to separate the glass melt gob. In this method, a guide equipped with multiple gas spray outlets and comprised of a porous material was positioned on the outer perimeter holding surface around the glass on the support member and gas was blown out to both confine the outer diameter of the glass melt gob and prevent the glass from being pulled when the support member was moved rapidly in a horizontal direction.

The preforms for press molding that were formed in this manner had rotational symmetry and exhibited no defects such as crizzles, cracks, or striae. The weight precision fully satisfied the requirements of precision press molding.

All of the molded preforms obtained as set forth above were suitable for precision press molding.

Comparative Examples

When a device obtained by removing the drop cutting device from the above-described device and imparting a drop cutting function to the glass gob forming die was employed to form preforms identical in weight to those described above at an identical production rate, the preforms obtained were deformed and were not rotationally symmetrical in shape. Crizzles and cracks were observed in the preforms. The glass gob forming die was stopped for 2.5 sec to receive the glass melt gob and the horizontal force exerted on the glass gobs during movement was $7 \times 10^{-4}$ N. The above defective products were thought to be the result of a force of such magnitude being exerted on the glass gobs during movement or the large difference in cooling rates of the upper and lower surfaces of the glass gobs.

In the present comparative example, all 12 glass gob forming dies were microadjusted so that the height when receiving the glass melt was within 50 micrometers and the weight tolerance was ±10 mg.

Example 2

The preforms formed in Example 1 were cleaned and dried, after which precision press molding was conducted to produce aspherical lenses. The press molding was conducted in a nitrogen atmosphere with a pressing mold having a carbon film formed on molding surfaces made of SiC. In press molding, the preform was heated to 635° C. and pressed for 60 sec at a pressure of 100 kgf/cm$^2$. Following press molding, the aspherical lens was removed from the mold and gradually cooled. The lens obtained had both a good interior and a good exterior surface. Such lenses could be centered and edged, and an antireflective film formed on the surface as needed.

Example 3

A glass starting material blended to finally yield desired optical characteristics such as refractive index, dispersion, and transmissivity was melted by heating, degassed, refined, and homogenized by stirring to obtain a glass melt. This glass melt was caused to continuously flow at a certain flow rate through a platinum alloy nozzle maintained at a controlled temperature. The amount of glass drawn was 10 kg/day, and the flow rate was set to 10 mm/sec.

The glass melt flow was formed into preforms for press molding by the device shown in FIG. 7.

The support member employed in the present Example was a triangular rod of stainless steel having a regular triangular bottom surface measuring 20 mm on a side. To prevent fusion between the support member and the glass melt, a hole 8 mm in diameter was formed in the center, and cooling was conducted by passing water through this hole.

First, the drop cutting device in the form of the support member was raised to a position where the mirror-finished glass-receiving surface was 3 mm below the front end of the nozzle and stopped. In this state, the glass-receiving surface was maintained horizontal (with the glass-receiving surface facing the area vertically above it). Next, the lower edge portion of the fluid droplet glass melt flow exiting the nozzle was loaded onto the glass-receiving surface. Since the amount of glass melt present on the glass-receiving surface increased with time, the support member was lowered vertically at a rate of 1 mm/sec to prevent the glass melt from wetting the perimeter of the front end of the nozzle.

Next, the support member was pulled away vertically downward at a rate of 12 mm/sec to end cooling of the lower edge portion of the glass. After cooling was ended, since glass melt was again fed from the front end of the nozzle, the viscosity of the glass at the front end of the nozzle diminished, the glass again assumed a spherical shape, and the increase in weight and decrease in viscosity caused the glass to drip onto the glass-receiving surface (the surface in contact with the glass during cooling) of the support member waiting below.

The support member was then rotated 120° about the center axis of the triangular rod, causing the glass to drop into the center of the glass gob forming die (venturi tube) waiting beneath the support member. The bottom of the venturi tube had gas spray outlets through which inert gas was blown upward to float form the glass.

In this manner, successive glass gobs of prescribed weight dripped down and were formed into preforms for press molding. Table 1 gives the cutting time (dripping cycle), duration of cooling, preform weight, and tolerance.

The above preforms were made from optical glass having a refractive index (nd) of 1.583, an Abbé number (ν d) of 59.5, a glass transition temperature of 503° C., a softening point of 590° C., and a difference between the softening point and glass transition temperature of 87° C. However, good forming was also possible with optical glass for precision press molding such as optical glass having a refractive index (nd) of 1.806, an Abbé number (ν d) of 40.7, a glass transition temperature of 545° C., a softening point of 620° C., and a difference between the softening point and glass transition temperature of 75° C., and optical glass having a refractive index (nd) of 1.693, an Abbé number (ν d) of 53.2, a glass transition temperature of 554° C., a softening point of 588° C., and a difference between the softening point and glass transition temperature of 34° C.

The preforms for press molding that were formed in this manner exhibited no defects such as crizzles, cracks, or striae. The weight precision fully satisfied the requirements of precision press molding.

TABLE 1

| Example | Cutting time (s) | Duration of cooling (s) | Preform weight (mg) | shape | quality |
|---|---|---|---|---|---|
| 3-1 | 0.6 | 0.2 | 50 ± 0.5 | spherical | good |
| 3-2 | 1.0 | 0.5 | 100 ± 0.7 | spherical | good |
| 3-3 | 1.5 | 1.0 | 200 ± 1.1 | spherical | good |
| 3-4 | 2.0 | 1.4 | 300 ± 1.4 | spherical | good |
| 3-5 | 2.0 | 1.6 | 500 ± 2.0 | spherical | good |

Example 4

The preform formed in Example 3 was cleaned and dried, after which an aspherical lens was manufactured by precision press molding. The press molding was conducted in a nitrogen atmosphere with a pressing mold having a carbon film formed on molding surfaces. Following press molding, the aspherical lens was removed from the mold and cooled. The lens obtained had both a good interior and a good exterior surface. The lens could be centered and edged, and an antireflective film formed on the surface as needed.

The present Example relates to a method of manufacturing aspherical lenses, but can also be applied to the manufacturing of other optical elements such as prisms and diffraction gratings.

The present invention is useful for producing glass articles such as high-quality preforms for press molding from glass melt, and for producing optical elements such as lenses by press molding these preforms.

What is claimed is:

1. A method of manufacturing glass preforms for press molding by continuously separating glass gobs from a glass melt flow continuously flowing out of a nozzle at a rate of flow and forming the separated glass gobs with glass preform forming members that are intermittently or continuously moving, the method comprising:
   moving a support member whereby said support member approaches a front end of the nozzle, so that a front end of the glass melt flow is received by the support member, and then dropping the support member more rapidly than the rate of flow of the glass melt flow to separate a glass gob from the glass melt flow;
   transferring the separated glass gob from the support member to a stopped or moving glass preform forming member, which is operative to form a glass preform for press molding; and
   forming the glass preform by moving at least one glass preform forming member while cooling the glass to form a solid glass preform, wherein
   in the case where the glass gob is transferred to a stopped glass preform forming member, the period during which the glass preform forming member is stopped for transfer of the glass gob from the support member to the glass preform forming member is made shorter than a gob preparation period, defined as the time required for preparing one glass gob from the glass melt flow using the support member and transferring the glass gob to the glass preform forming member.

2. A method of manufacturing glass preforms for press molding by continuously separating glass gobs from a glass melt flow continuously flowing out of a nozzle at a rate of flow and forming the separated glass gobs with glass preform forming members that are intermittently or continuously moving, the method comprising:
   moving a support member whereby said support member approaches a front end of the nozzle, so that a front end of the glass melt flow is received by the support member, the front end being supported to form a constriction between the nozzle side and the support side of the glass melt flow, and then dropping the support member to separate the glass gob from the glass melt flow at the constriction;
   transferring the separated glass gob from the support member to a stopped or moving glass preform forming member, which is operative to form a glass preform for press molding; and
   forming the glass preform by moving at least one glass preform forming member while cooling the glass to form a solid glass preform, wherein
   in the case where the glass gob is transferred to a stopped glass preform forming member, the period during which the glass preform forming member is stopped for transfer of the glass gob from the support member to the glass preform forming member is made shorter than a gob preparation period, defined as the time required for preparing one glass gob from the glass melt flow using the support member and transferring the glass gob to the glass preform forming member.

3. A method of manufacturing glass preforms for press molding by continuously separating glass gobs from a glass melt flow continuously flowing out of a nozzle at a rate of flow and molding the separated glass gobs with glass preform forming members that are intermittently or continuously moving, the method comprising:
   moving a support member whereby said support member approaches a front end of the nozzle, so that a front end of the glass melt flow is received by the support member, the front end being supported to form a constriction between the nozzle side and the support side of the glass melt flow, and then removing support of the support member to separate the glass gob from the glass melt flow at the constriction;
   transferring the separated glass gob from the support member to a stopped or moving glass preform forming member, which is operative to form a glass preform for press molding; and
   forming the glass preform by moving at least one glass preform forming member while cooling the glass to form a solid glass preform, wherein
   in the case where the glass gob is transferred to a stopped glass preform forming member, the period during which the glass preform forming member is stopped for transfer of the glass gob from the support member to the glass preform forming member is made shorter than a gob preparation period, defined as the time required for preparing one glass glob from the glass melt flow using the support member and transferring the glass gob to the glass preform forming member.

4. A method of manufacturing glass preforms for press molding optical elements by continuously separating glass gobs from a glass melt flow continuously flowing out of a nozzle at a rate of flow and forming the separated glass gobs with glass preform forming members that are intermittently or continuously moving, comprising:
   a gob forming-step of receiving the front end of the glass melt flow by a support member and dropping the support member more rapidly than the flow rate of the glass melt flow to separate the glass gob, said gob forming step being preformed once in a fixed cycle period,
   transferring the separated glass gob from the support member to a stopped or moving glass preform forming member to mold a glass preform; and
   forming the glass preform by moving at least one glass preform forming member while cooling the glass to form a solid glass preform, wherein
   in the case where the glass gob is transferred to a stopped glass preform forming member, the period during which the glass preform forming member is stopped for transfer of the glass gob from the support member to the glass preform forming member is made less than or equal to 70 percent of said fixed cycle period.

5. A method of manufacturing glass preform for press molding optical elements by continuously separating glass gobs from a glass melt flow continuously flowing out of a nozzle at a rate of flow and forming the separated glass gobs with glass preform forming members that are intermittently or continuously moving, comprising:

a gob forming step of receiving a front end of the glass melt flow by a support member, supporting the front end to form a constriction between the nozzle side and the support side of the glass melt flow, and dropping the support member to separate the glass gob from the glass melt flow at the constriction, said gob forming steps being preformed once in a fixed cycle period, transferring the separated glass gob from the support member to a stopped or moving glass preform forming member to mold a glass preform; and forming the glass preform by moving at least one glass preform forming member while cooling the glass to form a solid glass preform, wherein in the case where the glass gob is moved to a stopped glass preform forming member, the period during which the glass preform forming member is stopped for transfer of the glass gob from the support member to the glass preform forming member is made less than or equal to 70 percent of the above cycle period.

6. A method of manufacturing glass preforms for press molding optical elements by continuously separating glass gobs from a glass melt flow continuously flowing out of a nozzle and forming the separated glass gobs with glass preform forming members that are intermittently or continuously moving, comprising:

a gob forming-step of receiving the front end of the glass melt flow by a support member, supporting the front end to form a constriction between the nozzle side and the support side of the glass melt flow, and removing support from the support member to separate the glass gob from the glass melt flow at the constriction, said gob forming step being preformed once in a fixed cycle period, transferring the separated glass gob from the support member to a stopped or moving glass preform forming member to form a glass preform; and forming the glass preform by moving at least one glass preform forming member while cooling the glass to form a solid glass preform, wherein in the case where the glass gob is transferred to a stopped glass-preform forming member, the period during which the glass preform forming member is stopped for transfer of the glass gob from the support member to the glass preform forming member is made less than or equal to 70 percent of the above cycle period.

7. The manufacturing method according to any of claims 1 to 3, wherein the period during which the glass preform forming member is stopped for transfer of the glass gob from the support member to the glass preform forming member, or the time for transferring the glass gob from the support member to a moving glass preform forming member, is made shorter than a gob separation period, defined as the time from when the support member begins to approach the nozzle to when the glass gob has been completely separated.

8. The manufacturing method according to any of claims 1 to 3 and 5-7, wherein the surface receiving the glass gob of the support member is a flat surface and this flat surface is rotated 360° to transfer the glass gob to the glass forming member.

9. The manufacturing method according to any of claims 1 to 3 and 5-7, wherein the surface of the support member receiving the glass gob is tilted to cause the glass gob to fall off, thereby transferring the glass gob to the glass preform forming member, and the direction of the fall of the glass gob is consistent with the direction of movement of the glass preform forming member.

10. The manufacturing method according to any of claims 1 to 3 and 5-7, wherein two consecutively produced glass gobs are separated by receiving the glass melt flow on two different surfaces of the support member.

11. The manufacturing method according to any of claims 1 to 3 and 5-7, wherein, in the course of transferring the glass gob from the support member to the glass preform forming member, the glass gob is turned upside down.

12. The manufacturing method according to any of claims 1 to 3 and 5-7, wherein gas is blown from the surface of the support member receiving the front end of the glass melt flow when receiving said front end.

13. The manufacturing method according to any of claims 1 to 3 and 4-6, wherein the glass preform comprises optical glass.

14. The manufacturing method according to any of claims 1 to 3 and 4-6, wherein said forming step comprises float forming while said glass gob is formed while floating on a blown gas.

15. A method of manufacturing optical elements, comprising:

(1) manufacturing glass preforms for press molding by continuously separating optical glass gobs from a glass melt flow continuously flowing out of a nozzle at a rate of flow and forming the separated glass gobs with glass preform forming members that are intermittently or continuously moving, the method comprising:

moving a support member whereby said support member approaches a front end of the nozzle, so that a front end of the glass melt flow is received by the support member, and then dropping the support member more rapidly than the rate of flow of the glass melt flow to separate a glass gob from the glass melt flow;

transferring the separated glass gob from the support member to a stopped or moving glass preform forming member, which is operative to form a glass preform for press molding; and forming the glass preform by moving at least one glass preform forming member while cooling the glass to form a solid glass preform, wherein in the case where the glass gob is-transferred to a stopped glass preform forming member, the period during which the glass preform forming member is stopped for transfer of the glass gob from the support member to the glass preform forming member is made shorter than a gob preparation period, defined as the time required for preparing one glass gob from the glass melt flow using the support member and transferring the glass gob to the glass preform forming member;

(2) heat softening the glass preform; and (3) then, press molding the softened glass preform into an optical element.

16. A method of manufacturing glass gobs in which glass gobs are formed from a glass melt flowing out of a nozzle, at a flow speed, characterized in that:

prior to dripping from the nozzle, bringing the glass melt flowing out into contact with a support member beneath a lower end of the glass melt flowing out of the nozzle, the glass melt being cooled when brought into contact with the support member that is cooled by circulation of a coolant through the support member, and then moving the support member downward from beneath the lower end of the glass melt at a speed greater than the flow speed of the glass melt, causing a glass gob of prescribed weight to drip onto the support member from the nozzle, wherein according to the moving step, prior to dripping of the glass gob into the support member, the support member is moved downward in such a manner that contact is temporarily broken between the support member and the lower end of the glass melt.

17. The manufacturing method according to claim 16, further characterized in that the glass gob that has dripped is rendered spherical on the support member or after being moved to the glass preform forming member from the support member.

18. The manufacturing method according to any of claims 16, further characterized in that the difference between the softening point and the glass transition temperature of the glass is less than or equal to 100° C.

19. The method of manufacturing glass gobs according to any of claim 16, further characterized in that the glass gob is a preform for press molding.

20. A method of manufacturing optical elements, comprising:
(1) manufacturing glass gobs in which glass gobs are formed from an optical glass melt flowing out of a at a flow speed , characterized in that:
prior to dripping from the nozzle, bringing the glass melt flowing out into contact with a support member beneath a lower end of the glass melt flowing out of the nozzle, the glass melt being cooled when brought into contact with the support member that is cooled by circulation of a coolant through the support member, and
then moving the support member downward from beneath the lower end of the glass melt at a speed grater than the flow speed of the glass melt, causing a glass gob of prescribed weight to drip onto the support member from the nozzle,
wherein according to the moving step, prior to dripping of the glass gob onto support member, the support member is moved downward in such a manner that contact is temporarily broken between the support member and the lower end of the glass melt;
(2) heat softening the glass gob formed into a glass preform; and
(3) then, press molding the softened glass preform into an optical element.

21. A method of manufacturing optical elements, comprising:
(1) manufacturing glass preforms for press molding by continuously separating glass gobs from a glass melt flow continuously flowing out of a nozzle at a rate of flow and forming the separated glass gobs with glass preform forming members that are intermittently or continuously moving, the method comprising:
moving a support member whereby said support member approaches a front end of the nozzle, so that a front end of the glass melt flow is received by the support member, the front end being supported to form a constriction between a nozzle side and a support side of the glass melt flow, and then dropping the support member to separate the glass gob from the glass melt flow at the constriction;
transferring the separated glass gob from the support member to a stopped or moving glass preform forming member, which is operative to form a glass preform for press molding; and
forming the glass preform by moving at least one glass preform forming member while cooling the glass to form a solid glass preform, wherein
in the case where the glass gob is transferred to a stopped glass preform forming member, the period during which the glass preform forming member is stopped for transfer of the glass gob from the support member to the glass preform forming member is made shorter than a gob preparation period, defined as the time required for preparing one glass gob from the glass melt flow using the support member and transferring the gloss gob to the glass preform forming member;
(2) heat softening the glass preform; and
(3) then, press molding the softened glass preform into an optical element.

22. A method of manufacturing optical elements, comprising:
(1) manufacturing glass preforms for press molding by continuously separating glass gobs from a glass melt flow continuously flowing out of a nozzle at a rate of flow and molding the separated glass gobs with glass preform forming members that are intermittently or continuously moving, the method comprising:
moving a support member whereby said support member approaches a front end of the nozzle, so that a front end of the glass melt flow is received by the support member, the front end being supported to form a constriction between the nozzle side and the support side of the glass melt flow, and then removing support of the support member to separate the glass gob from the glass melt flow at the constriction;
transferring the separated glass gob from the support member to a stopped or moving glass preform forming member, which is operative to form a glass preform for press molding; and
forming the glass preform by moving at least one glass preform forming member while cooling the glass to form a solid glass preform, wherein
in the case where the glass gob is transferred to a stopped glass preform forming member, the period during the which the glass preform forming member is stopped for transfer of the glass gob from the support member to the glass preform forming member is made shorter than a gob preparation period, defined as the time required for preparing one glass glob from the glass melt flow using the support member and transferring the glass gob to the glass preform forming member;
(2) heat softening the glass preform; and
(3) then, press molding the softened glass preform into an optical element.

23. A method of manufacturing optical elements, comprising:
(1) manufacturing glass preforms for press molding optical elements by continuously separating glass gobs from a glass melt flow continuously flowing out of a nozzle at a rate of flow and forming the separated glass gobs with glass preform forming members that are intermittently or continuously moving, comprising:
a gob forming-step of receiving a front end of the glass melt flow by a support member and dropping the support member more rapidly than the flow of the glass melt flow to separate the glass gob, said gob forming step being preformed once ion a fixed cycle period,
transferring the separated glass gob from the support member to a stopped or moving glass preform forming member to mold a glass preform; and
forming the glass preform by moving at least one glass preform forming member while cooling the glass to form a solid glass preform, wherein in the case where the glass gob is transferred to a stopped glass preform forming member, the period during which the glass preform forming member is stopped for transfer of the glass gob from the support member to the glass preform forming member is made less than or equal to 70 percent of said fixed cycle period;

(2) heat softening the glass preform; and (3) then, press molding the softened glass preform into an optical element.

24. A method of manufacturing optical elements, comprising:

(1) manufacturing glass preforms for press molding optical elements by continuously separating glass gobs from a glass melt flow continuously flowing out of a nozzle at a rate of flow and forming the separated glass gobs with glass preform forming members that are intermittently or continuously moving, comprising:

a gob forming step of receiving a front end of the glass melt flow by a support member, supporting the front end to form a constriction between the nozzle side and the support side of the glass melt flow, and dropping the support member to separate the glass gob from the glass melt flow at the constriction, said gob forming step being preformed once in a fixed cycle period, transferring the separated glass gob from the support member to a stopped or moving glass preform forming member to mold a glass preform; and forming the glass preform by moving at least one glass preform forming member while cooling the glass to form a solid glass preform, wherein in the case where the glass gob is moved to a stopped glass preform forming member, the period during which the glass preform forming member is stopped for transfer of the glass gob from the support member to the glass preform forming member is made less than or equal to 70 percent of said fixed cycle period;

(2) heat softening the glass preform; and (3) then, press molding the softened glass preform into an optical element.

25. A method of manufacturing optical elements, comprising:

(1) manufacturing glass preforms for press molding optical elements by continuously separating glass gobs from a glass melt flow continuously flowing out of a nozzle at a rate of flow and forming the separated glass gobs with glass preform forming members that are intermittently or continuously moving, comprising:

a gob forming step of receiving a front end of the glass melt flow by a support member, supporting the front end to form a constriction between the nozzle side and the support side of the glass melt flow, and dropping the support member to separate the glass gob from the glass melt flow at the constriction, said gob forming step being preformed once in a fixed cycle period, transferring the separated glass gob from the support member to a stopped or moving glass preform forming member to form a glass preform; and forming the glass preform by moving at least one glass preform forming member while cooling the glass to form a solid glass preform, wherein in the case where the glass gob is transferred to a stopped glass-preform forming member, the period during which the glass preform forming member is stopped for transfer of the glass gob from the support member to the glass preform forming member is made less than or equal to 70 percent of said fixed cycle period;

(2) heat softening the glass preform; and (3) then, press molding the softened glass preform into an optical element.

* * * * *